United States Patent
Sonoda et al.

(10) Patent No.: US 9,660,906 B2
(45) Date of Patent: May 23, 2017

(54) METHOD FOR ACQUIRING PACKET, DEVICE AND RECORDING MEDIUM

(71) Applicant: FUJITSU LIMITED, Kawasaki-shi, Kanagawa (JP)

(72) Inventors: Masataka Sonoda, Kawasaki (JP); Noriyuki Fukuyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 14/619,209

(22) Filed: Feb. 11, 2015

(65) Prior Publication Data
US 2015/0263943 A1    Sep. 17, 2015

(30) Foreign Application Priority Data
Mar. 11, 2014    (JP) .................................. 2014-047182

(51) Int. Cl.
*H04L 12/721*    (2013.01)
*H04L 29/08*    (2006.01)

(52) U.S. Cl.
CPC .......... *H04L 45/70* (2013.01); *H04L 67/1095* (2013.01); *H04L 67/1002* (2013.01)

(58) Field of Classification Search
None
See application file for complete search history.

(56) References Cited

U.S. PATENT DOCUMENTS

| 5,315,580 A | * | 5/1994 | Phaal | H04L 43/022 370/232 |
| 2013/0315265 A1 | * | 11/2013 | Webb, III | H04J 3/0635 370/516 |
| 2014/0044004 A1 | * | 2/2014 | Oda | H04L 41/5067 370/253 |

FOREIGN PATENT DOCUMENTS

JP    2008-244632 A    10/2008

* cited by examiner

*Primary Examiner* — Kevin C Harper
*Assistant Examiner* — Derrick V Rose
(74) *Attorney, Agent, or Firm* — Fujitsu Patent Center

(57) ABSTRACT

A method for acquiring a packet of a monitoring target, the method includes, forming, by a control unit, a mirror path for arriving a mirror packet, of which a origin or a destination of a transmission is a virtual machine for the monitoring target, at a monitoring device which monitors the mirror packet through one or more relay devices, detecting, by the control unit, an occupation when a packet except the packet, of which the origin or the destination of a transmission is the virtual machine for the monitoring target, does not pass based on history information of the packet which passes the relay device, accumulating, by the monitoring device, the mirror packet which passes the relay device, and extracting, by the monitoring device, the mirror packet which arrived at in the occupation as the packet for the monitoring target.

20 Claims, 27 Drawing Sheets

FIG. 4A
~31

| SERVICE ID | TARGET TENANT | MONITORING POINT | MIRRORING PATH ID | START TIME | END TIME |
|---|---|---|---|---|---|
| s0001 | Ta | va$_1$ | mp0001 | 2013/07/31 09:00:00 | 2013/07/31 10:00:00 |
| ... | ... | ... | ... | ... | ... |

FIG. 4B
~32

| MIRRORING PATH ID | SERVICE ID | MIRRORING DATA ACQUISITION START TIME | MIRRORING DATA LATEST ACQUISITION TIME | CONSTITUTION SW INFORMATION | |
|---|---|---|---|---|---|
| | | | | SW ID | TARGET COMMUNICATION INFORMATION IN EACH SW |
| mp0001 | s0001 | 2013/07/31 09:00:00 | 2013/07/31 10:00:00 | vsw11 | 0001, 0002 |
| | | | | TOR11 | 0301, 0302 |
| | | | | CSW1 | 0501, 0502 |
| | | | | TOR21 | 0701, 0702 |

| swID | ACQUISITION DATE AND TIME | FLOW ID | FLOW CONDITION | | MONITORING INFORMATION | | |
|---|---|---|---|---|---|---|---|
| | | | ORIGIN OF TRANSMISSION | DESTINATION OF TRANSMISSION | NUMBER OF PACKETS | QUANTITY OF BYTE | PERIOD[SEC] |
| vsw11 | 2013/07/31 09:00:00-09:00:03 | 0001 | $va_1$ | * | 287 | 3,845 | 4000 |
| | | 0002 | * | $va_1$ | 205 | 3,067 | 4000 |
| | | ... | ... | ... | ... | ... | ... |

| FLOW ID | MIRRORING TARGET | COMMUNICATION NUMBER OF PACKETS IN EACH PERIOD | | | | | |
|---|---|---|---|---|---|---|---|
| | | 09:00:00-09:00:03 | 09:00:03-09:00:06 | ... | 09:20:30-09:20:33 | ... | 09:45:40-09:45:43 | ... | 09:59:57-10:00:00 |
| 0001 | yes | 287 | 300 | ... | 84 | ... | 301 | ... | 99 |
| 0002 | yes | 205 | 150 | ... | 110 | ... | 91 | ... | 102 |
| 0003 | no | 0 | 203 | ... | 0 | ... | 0 | ... | 121 |
| 0301 | yes | 287 | 300 | ... | 84 | ... | 301 | ... | 99 |
| 0302 | yes | 205 | 150 | ... | 110 | ... | 91 | ... | 102 |
| 0303 | no | 104 | 0 | ... | 0 | ... | 0 | ... | 24 |
| 0304 | no | 0 | 203 | ... | 0 | ... | 0 | ... | 121 |
| 0501 | yes | 287 | 300 | ... | 84 | ... | 0 | ... | 99 |
| 0502 | yes | 205 | 150 | ... | 110 | ... | 0 | ... | 102 |
| 0503 | no | 104 | 0 | ... | 0 | ... | 0 | ... | 24 |
| 0701 | yes | 287 | 300 | ... | 84 | ... | 0 | ... | 99 |
| 0702 | yes | 205 | 150 | ... | 110 | ... | 0 | ... | 102 |
| 0703 | no | 104 | 0 | ... | 0 | ... | 0 | ... | 24 |

FIG. 6

| SERVICE ID | TARGET TENANT | MONITORING POINT | MONITORING PERIOD | OCCUPATION | |
|---|---|---|---|---|---|
| | | | | MIRRORING PATH ID | OCCUPATION |
| s0001 | Ta | va$_1$ | 2013/07/31 09:00:00—10:00:00 | mp0001 | •2013/07/31 09:20:30—09:20:33 •2013/07/31 09:45:42—09:45:45 |

FIG. 13

| FLOW ID | MIRRORING TARGET | COMMUNICATION NUMBER OF PACKETS IN EACH PERIOD ||||||
|---|---|---|---|---|---|---|---|
| | | 09:00:00 - 09:00:03 | 09:00:03 - 09:00:06 | ... | 09:20:30 - 09:20:33 | ... | 09:45:42 - 09:45:45 | ... | 09:59:57 - 10:00:00 |
| 0001 | yes | 20 | 300 | ... | 84 | ... | 301 | ... | 99 |
| 0002 | yes | 105 | 150 | ... | 110 | ... | 91 | ... | 102 |
| 0003 | no | 0 | 203 | ... | 0 | ... | 0 | ... | 121 |
| 0301 | yes | 20 | 300 | ... | 84 | ... | 301 | ... | 99 |
| 0302 | yes | 105 | 150 | ... | 110 | ... | 91 | ... | 102 |
| 0303 | no | 44 | 0 | ... | 0 | ... | 0 | ... | 24 |
| 0304 | no | 0 | 203 | ... | 0 | ... | 0 | ... | 121 |
| 0501 | yes | 20 | 300 | ... | 99 | ... | 301 | ... | 99 |
| 0502 | yes | 105 | 150 | ... | 43 | ... | 91 | ... | 102 |
| 0503 | no | 44 | 0 | ... | 0 | ... | 0 | ... | 24 |
| 0701 | yes | 20 | 300 | ... | 99 | ... | 301 | ... | 99 |
| 0702 | yes | 105 | 150 | ... | 43 | ... | 91 | ... | 102 |
| 0703 | no | 44 | 0 | ... | 0 | ... | 0 | ... | 24 |

FIG. 14

| | | | | MIRRORING PATH ID | OCCUPATION |
|---|---|---|---|---|---|
| SERVICE ID | TARGET TENANT | MONITORING POINT | MONITORING PERIOD | | OCCUPATION |
| s0001 | Ta | va₁ | 2013/07/31 09:00:00 — 10:00:00 | mp0001 | • 2013/07/31 09:20:30 — 09:20:33<br>• 2013/07/31 09:45:42 — 09:45:45 |

| FLOW ID | MIRRORING TARGET | COMMUNICATION NUMBER OF PACKETS IN EACH PERIOD | | | | |
|---|---|---|---|---|---|---|
| | | 09:00:00-09:00:03 | 09:00:03-09:00:06 | ... | 09:20:30-09:20:33 | 09:29:57-09:30:00 |
| 0001 | yes | 287 | 300 | ... | 84 | 55 |
| 0002 | yes | 205 | 150 | ... | 110 | 23 |
| 0003 | no | 0 | 203 | ... | 0 | 34 |
| 0301 | yes | 287 | 300 | ... | 84 | 45 |
| 0302 | yes | 205 | 150 | ... | 110 | 99 |
| 0303 | no | 104 | 0 | ... | 0 | 13 |
| 0304 | no | 0 | 203 | ... | 0 | 200 |
| 0501 | yes | 287 | 300 | ... | 99 | 276 |
| 0502 | yes | 205 | 150 | ... | 43 | 33 |
| 0503 | no | 104 | 0 | ... | 0 | 0 |
| 0701 | yes | 287 | 300 | ... | 99 | 301 |
| 0702 | yes | 205 | 150 | ... | 43 | 91 |
| 0703 | no | 104 | 0 | ... | 0 | 0 |

FIG. 22A 34-5

| FLOW ID | MIRRORING TARGET | COMMUNICATION NUMBER OF PACKETS IN EACH PERIOD | | | | |
|---|---|---|---|---|---|---|
| | | 09:00:00 - 09:00:03 | 09:00:03 - 09:00:06 | ... | 09:20:30 - 09:20:33 | ... | 09:30:27 - 09:30:30 |
| 0001 | yes | 287 | 300 | ... | 84 | ... | 67 |
| 0002 | yes | 205 | 150 | ... | 110 | ... | 68 |
| 0003 | *no* | 0 | 203 | ... | *0* | ... | 122 |
| 0301 | yes | 287 | 300 | ... | 84 | ... | 67 |
| 0302 | yes | 205 | 150 | ... | 110 | ... | 68 |
| 0303 | *no* | 104 | 0 | ... | *0* | ... | 78 |
| 0304 | *no* | 0 | 203 | ... | *0* | ... | 199 |
| 0501 | yes | 287 | 300 | ... | 99 | ... | 67 |
| 0502 | yes | 205 | 150 | ... | 43 | ... | 68 |
| 0503 | *no* | 104 | 0 | ... | *0* | ... | 104 |
| 0701 | yes | 287 | 300 | ... | 99 | ... | 67 |
| 0702 | yes | 205 | 150 | ... | 43 | ... | 68 |
| 0703 | *no* | 104 | 0 | ... | *0* | ... | 90 |

FIG. 22B

| FLOW ID | MIRRORING TARGET | COMMUNICATION NUMBER OF PACKETS IN EACH PERIOD | | | |
|---|---|---|---|---|---|
| | | 09:30:30 - 09:30:33 | ... | 09:34:09 - 09:34:12 | ... | 09:59:54 - 09:59:57 | 09:59:57 - 10:00:00 |
| 0801 | yes | 69 | ... | 99 | ... | 109 | 55 |
| 0802 | yes | 70 | ... | 43 | ... | 111 | 24 |
| 0803 | no | 0 | ... | 0 | ... | 0 | 67 |
| 0804 | no | 0 | ... | 0 | ... | 0 | 77 |
| 0901 | yes | 69 | ... | 99 | ... | 109 | 55 |
| 0902 | yes | 70 | ... | 43 | ... | 111 | 24 |

| SERVICE ID | TARGET TENANT | MONITORING POINT | MONITORING PERIOD | MIRRORING PATH ID | OCCUPATION |
|---|---|---|---|---|---|
| s0001 | Ta | va$_1$ | 2013/07/31 09:00:00 — 10:00:00 | mp0001 | • 2013/07/31 09:20:30 — 09:20:33 |
| | | | | mp0002 | • 2013/07/31 09:34:09 — 09:34:12<br>• 2013/07/31 09:59:54 — 09:59:57 |

35-2

METHOD FOR ACQUIRING PACKET, DEVICE AND RECORDING MEDIUM

CROSS-REFERENCE TO RELATED APPLICATION

This application is based upon and claims the benefit of priority of the prior Japanese Patent Application No. 2014-047182, filed on Mar. 11, 2014, the entire contents of which are incorporated herein by reference.

FIELD

The embodiments discussed herein are related to a method for acquiring a packet of a monitoring target, a device for acquiring a packet of a monitoring target, and recording medium.

BACKGROUND

In an IaaS (Infrastructure as a Service) of which a cloud system provides, there is a technique to monitor a packet to occur in a tenant. For example, a provider of a cloud service installs an agent of the monitoring service in a virtual machine of the tenant which is provided to the user. And the agent acquires the packet that a virtual machine transmits and receives and performs the monitoring of the delay and the lost of the packet based on the packets which are acquired.

However, when installing the agent of the monitoring service on the virtual machine, the agent utilizes the resource of the virtual machine which is provided as the tenant. Accordingly, influence on performance of the virtual machine may increase with the increase of the agent. Further, there is a technique that the monitoring server which is installed the agent is prepared separately from the physical machine that the virtual machine operates and a relay device such as a switch performs a mirror of the packet, of which the virtual machine transmits and receives. Accordingly, the packet makes to reach the monitoring server. Therefore, it is possible that the monitoring server stores the packet (below called as mirror packet) which is performed the mirroring the packet of the virtual machine for the monitoring target.

CITATION LIST

Patent Document

[patent document 1] Japanese Laid-Open Patent Publication No. 2008-244632

SUMMARY

However, the cloud system provides a plurality of tenants. Therefore, one or more switches, which transfer packets (mirror packets), may process the packet of other tenants at same time. Because the process of the mirror packet stays by processing the packet of other tenants, a time to arrive at the monitoring server may delay.

The monitoring server considers the transmission and reception time of the mirror packet to be the time when the mirror packet arrived at the monitoring server. Therefore, when the time when the mirror packet arrives at the monitoring server delays, the monitoring server will consider the transmission and reception time of the mirror packet to be the delayed time. Therefore, some mirror packets may indicate wrong transmission and reception time. When the transmission and reception time of the packet is not correct, it is difficult that the monitoring server performs an appropriate monitoring process based on the packets which are accumulated.

According to a first aspect of the embodiment, a method for acquiring a packet of a monitoring target, the method includes forming, by a control unit, a mirror path for arriving a mirror packet, of which a origin or a destination of a transmission is a virtual machine for the monitoring target, at a monitoring device which monitors the mirror packet through one or more relay devices, detecting, by the control unit, an occupation when a packet except the packet, of which the origin or the destination of a transmission is the virtual machine for the monitoring target, does not pass based on history information of the packet which passes the relay device, accumulating, by the monitoring device, the mirror packet which passes the relay device, and extracting, by the monitoring device, the mirror packet which arrived at in the occupation as the packet for the monitoring target.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a diagram explaining the data structure of the monitoring service information 31 which is explained in FIG. 3, and FIG. 46 is a diagram explaining the data structure of the mirroring communication constitution information 32.

FIG. 5A is a diagram explaining data structure of the communication log 33 in FIG. 3, and FIG. 5B is a diagram explaining data structure of mirroring path communication record 34.

FIG. 6 is a diagram explaining data structure of occupation information 35 which was explained in FIG. 3.

FIG. 13 is a diagram explaining the mirroring path communication record 34 in the specific example.

FIG. 14 is a diagram indicating the occupation information 35-1 in the specific example.

FIG. 19 is a diagram explaining the communications record 34-2 of mirroring path "mp0001" Mpt1 before the occurrence of the migration in the specific example according to the second embodiment.

FIG. 22A and FIG. 22B are diagrams illustrating the mirroring path communication records 34-5, 34-6 in the specific example.

FIG. 23 is a diagram indicating the occupation information 35-2 in the specific example.

DESCRIPTION OF EMBODIMENTS (Cloud System)

Figure 1:
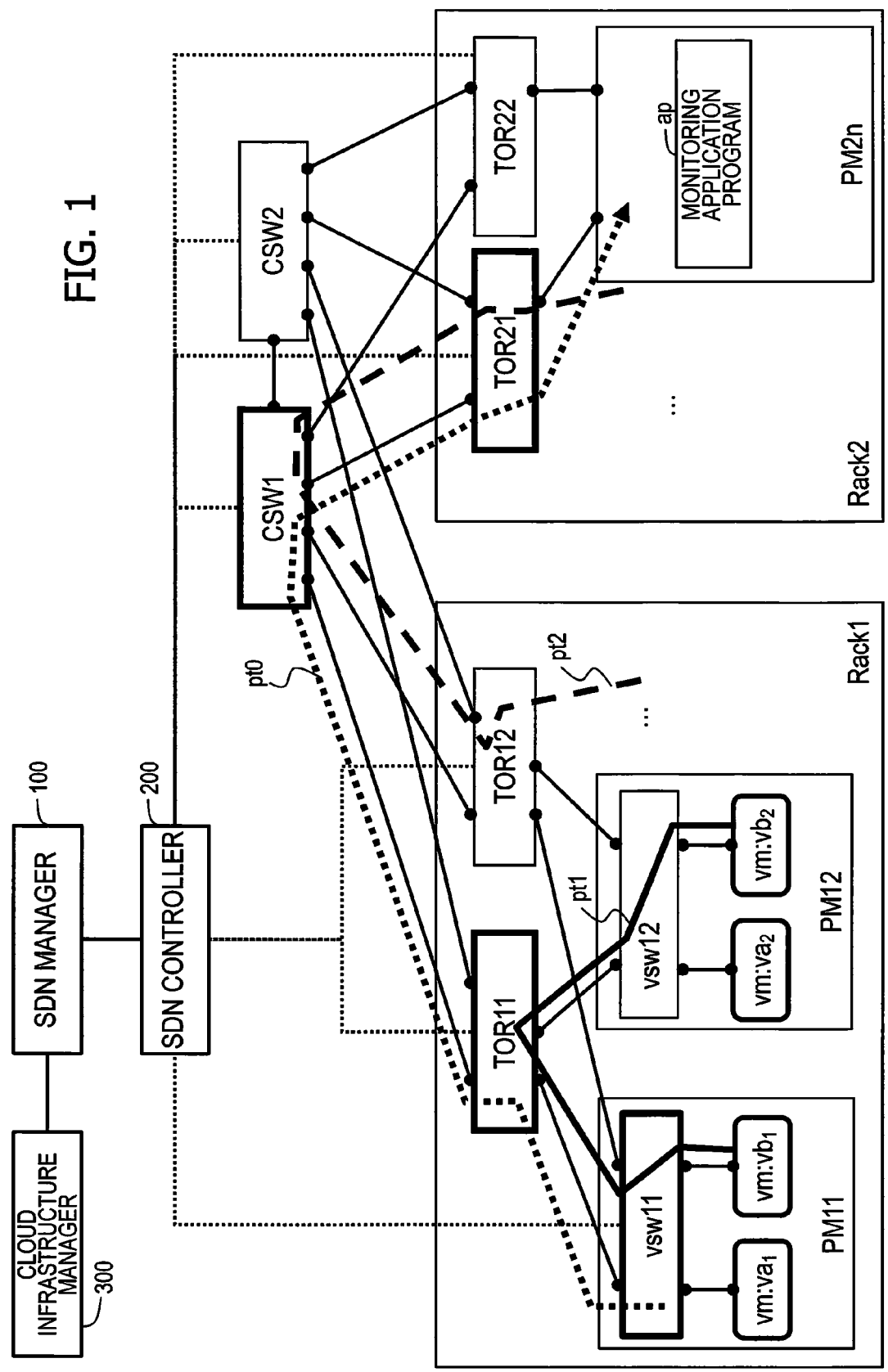
FIG. 1 is a diagram explaining a construction of the cloud system according to an embodiment.

FIG. 1 is a diagram explaining a construction of the cloud system according to an embodiment. For example, the cloud system depicted by FIG. 1 includes a cloud infrastructure manager (server) 300, a SDN (Software-Defined Network) manager (control device) 100 and a SDN (Software-Defined Network) controller 200, a first rack type server Rack1, a second rack type server Rack2, a first switch (relay device) CSW (Core Switch) 1, and a second switch (relay device) CSW (Core Switch) 2. The first switch CSW1 and the second switch CSW2 are constituted by a core switch.

The cloud infrastructure manager 300 in FIG. 1 performs construction and control of the cloud system. In addition, the SDN manager 100 controls dynamic setting and changes such as constitution, functions and performance of the network in the cloud system based an operation of the software. For example, the SDN manager 100 detects the status of each switch in the cloud system and controls setting and a change of the communication path information of the packet. The SDN controller 200 instructs the setting and the change for each switch based on the control by the SDN manager 100.

The rack type server Rack1 in FIG. 1 includes a first physical machine PM11, a second physical machine PM12, a first switch (relay device) TOR11, and a second switch (relay device) TOR12. The first switch TOR11 and the second switch TOR12 are constituted by Top of Rack (TOR) switches which are installed at top of the rack. In addition, the first physical machine PM11 operates a first virtual machine va1, a second virtual machine vb1, and a virtual switch (relay device) vsw11. In addition, the second physical machine PM12 operates a third virtual machine va2, a fourth virtual machine vb2, and a virtual switch (relay device) vsw12.

In addition, the rack type server Rack2 in FIG. 1 includes a third physical machine PM2$n$, a third Top of Rack (TOR) switch (relay device) TOR21, and a fourth switch (relay device) TOR22. The third physical machine PM2$n$ operates monitoring application program "ap" which monitors the packet of the virtual machine for the monitoring target. In the embodiment, the physical machine which operates the monitoring application "ap" is called as the monitoring server (monitor device) PM2$n$.

The cloud system in FIG. 1 provides the tenant which is the set of hardware resources to the user of the tenant. The user realizes objective processing with the resources of the tenant which is provided. In addition, the monitoring server PM2$n$ provides the monitoring service of the packet, in which the target virtual machine that is provided as the tenant transmits and receives, to the user of the tenant. Specially, the monitoring server PM2$n$ acquires the packet that the virtual machine of the tenant for the monitoring target processes and analyzes presence of a delay and the packet loss of the processing which are occurred on the virtual machine based on the packet which is acquired.

As one method to realize the monitoring service of the packet on the cloud system, there is a method to acquire a packet to occur with the virtual machine (below called as a monitoring point) for the monitoring target by operating a monitoring service agent on the virtual machine to provide as the tenant. Or, there is a method to acquire a packet for the monitoring target by installing the virtual machine which performs the monitoring process near the virtual machine for the monitoring target and by mirroring the packet. Or there is a method to build the monitoring service on the Hypervisor and the virtual switch (for example, the switches vsw11, vsw12) on the physical machine in which the virtual machine for the monitoring target operates. However, according to these methods, load is applied to the virtual machine which is provided as the tenant, and influence on performance of the virtual machine produces.

In addition, the constitution of the resources of the tenant of which the cloud system provides changes dynamically. For example, in an example of FIG. 1, the virtual machine va1 provided by a certain tenant may migrate to different another physical machine such as the virtual machine va2 by occurrence of the migration. Because a monitoring point is changed by the occurrence of the migration, it is need to change the machine operating the monitoring service.

Therefore, the SDN manager 100 according to the embodiment transfers the mirror packet of the virtual machine (monitoring point) for the monitoring target in the cloud system through one or more switches to the monitoring server PM2$n$. The monitoring server PM2$n$ works with a physical machine which is different from the physical machine of which the virtual machine for the monitoring target operates. Specially, the SDN manager 100 controls all switches (relay device) which constitutes passes (called as mirroring pass as follows) from the virtual machine for the monitoring target to the monitoring server PM2$n$ so that the mirror packet for the monitoring target arrives at the monitoring server PM2$n$.

The monitoring point in the cloud system in FIG. 1 is the virtual machine va1, for example. Specially, in FIG. 1, solid lines indicate connections between each component. Further, in FIG. 1, dotted line pt0 indicates the mirroring path to connect the monitoring server PM2$n$ with the virtual machine va1. In an example of FIG. 1, the virtual switch vsw11, the first switch TOR11, the switch CSW1, and the third switch TOR21 constitute the mirroring pass pt0. More specially, the virtual switch vsw11 performs the mirroring of a packet in which the virtual machine va1 is an origin and a destination of transmission, and transfers it to the switch TOR11. And the switch TOR11 transfers the mirror packet, in which the virtual machine va1 is an origin and a destination of transmission among the packets which are received from the switch vsw1, to the switch CSW1. Similarly, the switch CSW1 and the switch TOR21 transfer the mirror packet to next switch or the monitoring server PM2n.

In this way, according to the embodiment, the monitoring server PM2n accumulates the mirror packet of the virtual machine for monitoring target, which are transferred by one or more switches. The physical machine in which the virtual machine for the monitoring target works is different from the physical machine which works the monitoring server PM2n. Therefore, it is possible that the monitoring server PM2n acquires a packet for the monitoring target without affecting the performance of the virtual machine for the monitoring target. In addition, it is possible that the monitoring server PM2n acquires the packet for the monitoring target continuously even if the monitoring point changes by the occurrence of the migration.

However, the cloud system provides a plurality of tenants. For example, the virtual machine va1 and the virtual machine vb1 in FIG. 1 may be provided by a different tenant. Therefore, each switch, which constitutes the mirroring path pt0, may process the packet of other tenants in addition to the packet for the monitoring target. Because the process of the packet for the monitoring target stays when the switch processes the packet other than the packet for the monitoring target at same time band, a time when the packet for the monitoring target arrives at the monitoring server may delay.

The monitoring server PM2n considers the transmission and reception time of the mirror packet to be the time when the mirror packet arrived at the monitoring server PM2n. Therefore, when the time when the mirror packet arrives at the monitoring server PM2n delays, the monitoring server PM 2n will set the transmission and reception time of the mirror packet to the delayed time. In other words, the mirror packet that delayed has the transmission and reception time which is different from the transmission and reception time on the virtual machine (below called as a monitoring point) for the monitoring target. Therefore, it is difficult that the monitoring server PM2n performs an appropriate monitoring process based on the packets which are accumulated. In addition, it is difficult that the monitoring server PM2n extracts the mirror packet which has correct transmission and reception time from the mirror packet which are received.

Specially, in an example in FIG. 1, the switch vsw11 processes the packet of the communication path indicated by a bold line pt1 except the packet that the virtual machine va1 transmits and receives, for example. Similarly, the switch CSW1 processes the packet of the communication path indicated by a dashed line pt2 in addition to the packet that the virtual machine va1 transmits and receives. For example, when the switch CSW1 processes the packet of the communication path indicated by the dashed line pt2 and the mirror packet transferred by the switch vsw11 at the same time, the processing of the packet of the communication path indicated by the dashed line pt2 becomes the noise, and the processing of the mirror packet may stay. Thereby, the time when the mirror packet arrives at the monitoring server PM2n delays, and an error may occur at the transmission and reception time of the packet for the monitoring target.

Therefore, according to the packet acquisition method in the embodiment, the SDN manager 100 detects the occupation when the packet except the packet, of which the virtual machine for monitoring target is an origin and a destination of transmission, does not pass, based on history information of the packet which pass one or more switches which connect the monitoring server PM2n and the virtual machine for the monitoring target. In the occupation, it is based on the assumption that there is the period when only the packet (mirror packet) targeted for monitoring occupied the mirroring pass. And the SDN manager 100 considers the occupation, when only the packet for the monitoring target flowed through the mirroring pass pt0, to be a period without the noise by the packet except the packet for the monitoring target.

Then, SDN manager 100 notifies the user of the tenant of the occupation which is detected. The monitoring server PM2n extracts a packet which has transmission and reception time in the occupation as a packet for the monitoring, among the packets which are acquired. A packet for the monitoring that passed the switch within the occupation is a packet to have same transmission and reception time as transmission and reception time on the virtual machine va1. Therefore, it is possible that the monitoring server PM2n carries out appropriate monitoring processing based on a packet to have correct transmission and reception time.

While, the non-cloud system has static constitution of the system and do not provide a plurality of tenants. In other words, the non-cloud system may not change the monitoring point. Therefore, the monitoring server PM2n may directly connect to the monitoring point and receive a packet for the monitoring by the mirroring. In addition, the communication pass to connect the monitoring point and the monitoring server PM2n may become the occupation pass of the mirror packet for the monitoring. Therefore, above SDN manager 100 is effective to the cloud system.

(First Embodiment)

Then, hardware constitution and software configuration of the SDN manager 100 in FIG. 1 which controls the acquisition method of the packet according to the embodiment will be explained.

(Constitution of the SDN Manager)

Figure 2:
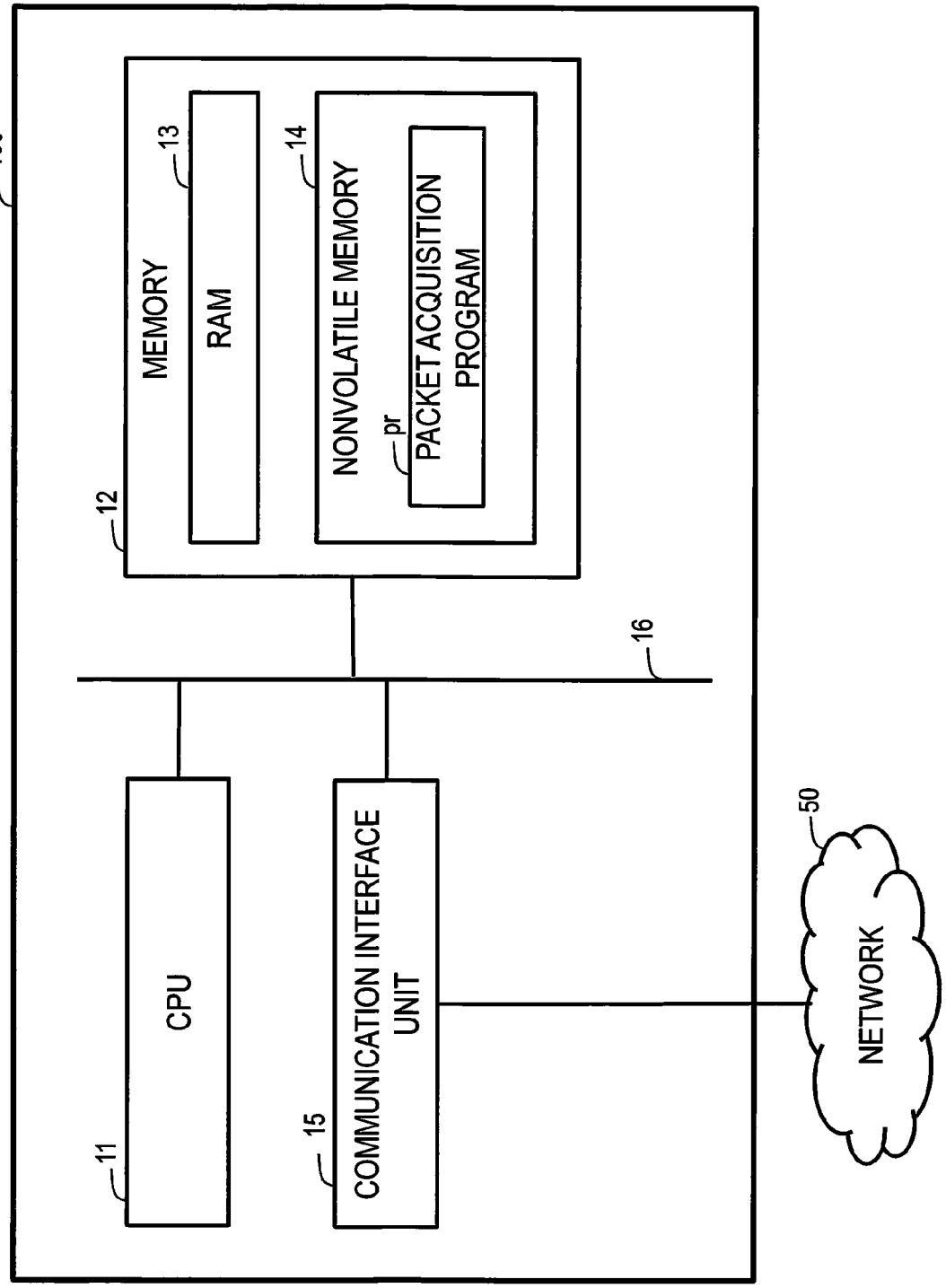
FIG. 2 is a diagram explaining hardware constitution of the SDN manager 100 in the cloud system depicted by FIG. 1.

FIG. 2 is a diagram explaining hardware constitution of the SDN manager 100 in the cloud system depicted by FIG. 1. The SDN manager 100 illustrated by FIG. 2 includes a CPU (Central Processing Unit) 11, a memory 12 such as a RAM (Random Access Memory) 13 and a nonvolatile memory 14, etc., and a communication interface unit 15, for example. The all components are connected through a bus 16 mutually.

The CPU 11 connects to the memory 12, etc. through the bus 16 and controls the whole SDN manager 100. The RAM 13 in the memory 102 stores data of which the CPU 11 processes. The nonvolatile memory 14 in the memory 12 has first domain (not illustrated in FIG. 2) which stores a program of OS (Operating System) of which the CPU 11 carries out and a second domain "pr" which stores the packet acquisition program in the embodiment. The nonvolatile memory 14 is constituted by a HDD (Hard disk drive), a nonvolatile semiconductor memory, etc.

The packet acquisition program (below called as a packet acquisition program pr) in the packet acquisition program domain "pr" realizes the acquisition process of the packet in the embodiment by an execution of the CPU 11. In addition, the communication interface unit 15 controls the transmission and reception of data between the SDN controller 200, the cloud infrastructure manager 300, and a client device (not illustrated in FIG. 2) through a network 50.

Figure 3:
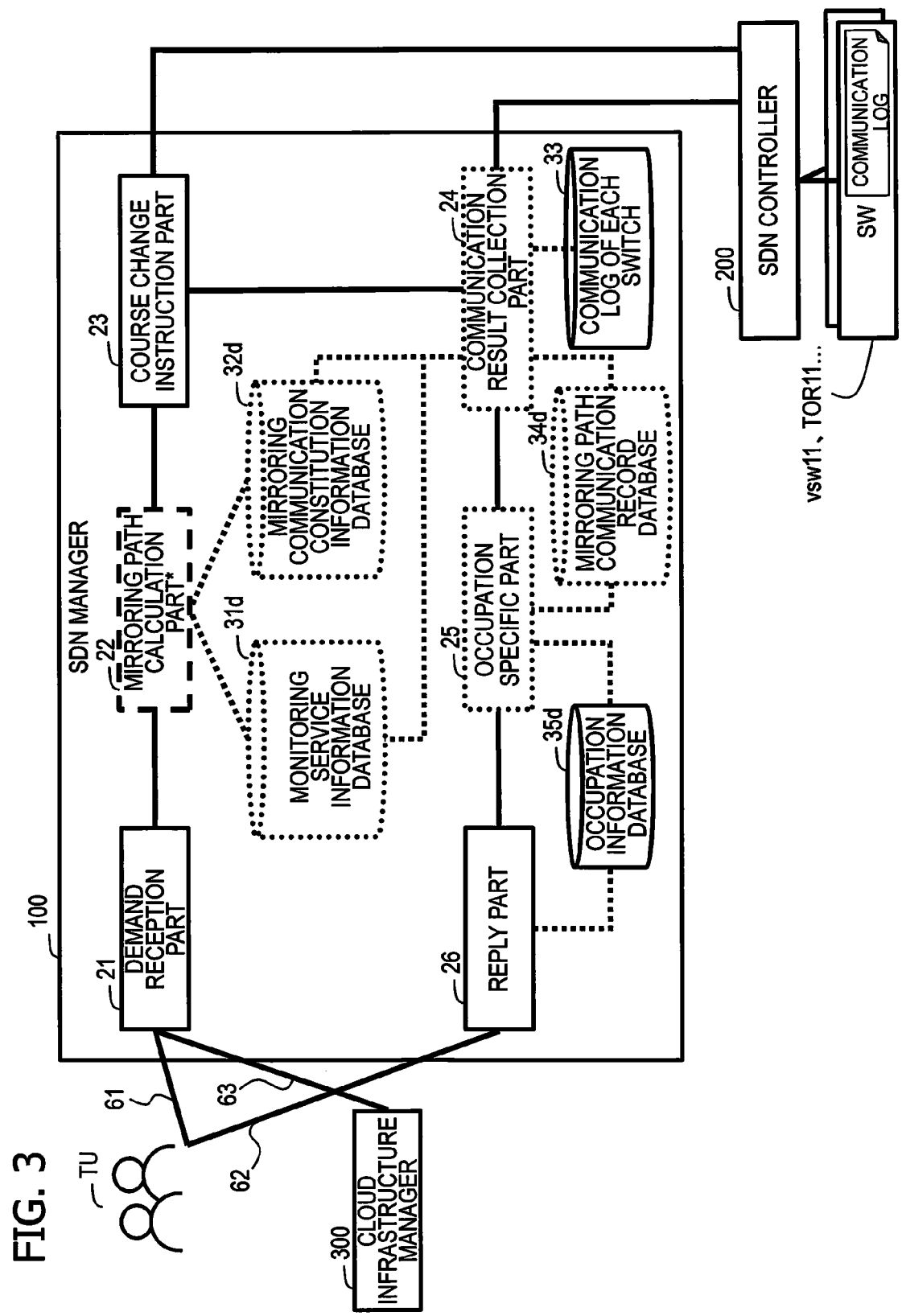
FIG. 3 is a software block diagram of the SDN manager 100 illustrated in FIG. 1 and FIG. 2.

FIG. 3 is a software block diagram of the SDN manager 100 illustrated in FIG. 1 and FIG. 2. The SDN manager 100 has a demand reception module (called as demand reception part as follows) 21, a mirroring path calculation module (called as a mirroring path calculation part as follows) 22, a course change instruction module (called as a course change instruction part as follows) 23, a communication result collection module (called as communication result collection part as follows) 24, a occupation specific module (called as a occupation specific part as follows) 25, and a reply module (called as reply part as follows) 26, as the software. Each module in which the SDN manager 100 has is equivalent to the packet acquisition program "pr" depicted by FIG. 2.

The demand reception part 21 accepts a mirroring demand 61 through a client device from the user Tu of the tenant. For example, the mirroring demand 61 is a packet monitoring demand including the monitoring point and a monitoring period. In addition, the demand reception part 21 accepts a notice 63 of occurrence of the migration from the cloud infrastructure manager 300.

The mirroring path calculation part 22 calculates the mirroring path (that is, "pt0" in FIG. 1) from the monitoring point to the monitoring server PM2n in response to the mirroring demand 61 input from the demand reception part 21. The mirroring path indicates the transfer course of packets from the virtual machine which is a monitoring point to the monitoring server PM2n, and includes one or more relay devices. The relay devices are the switches (the switches vsw11 and vsw12, the switches TOR11, TOR12, the switch CSW1, the switch Core SW2, the switch TOR21, and the switch TOR22) which are illustrated in FIG. 1, for example.

The mirroring path calculation part 22 stores monitoring service information 31 (as described later by FIG. 4A), that the mirroring demand which is received from the demand reception part 21 includes, in monitoring service information database (Data Base) 31d and stores mirroring communication constitution information 32 (as described later by FIG. 4B) of the mirroring path which is calculated in mirroring communication constitution information data base (Data Base) 32d. Then, the course change instruction part 23 sends the mirroring instructions of the packet for the monitoring to the switch constituting the mirroring path and transfer instructions to the monitoring server PM2n to the SDN controller 200.

The SDN controller 200 performs the mirroring instructions of the packet and the change instructions of the course for each switch, based on instructions from the course change instruction part 23. Each switch constituting the mirroring path performs the mirroring the packet for the monitoring, sends it to the next switch which constitutes the mirroring path and generates communication log 33 of all packets. For example, the communication log 33 includes the number of packets and the quantity of data of the packets for every scheduled time.

The communication result collection part 24 collects the communication log 33 of the switch constituting the mirroring path. The occupation specific part 25 generates a mirroring path communication record 34 based on the communication log 33 of each switch and stores it in the mirroring path communication record database (Data Base) 34d. The occupation specific part 25 identifies the period when the packet, in which the virtual device for the monitoring transmits and receives, occupied the mirroring path, based on the mirroring path communication record 34, as the occupation. And occupation specific part 25 stores identified occupation information 35 in occupation information database (Data Base) 35d. And the reply part 26 notifies the user Tu of the tenant of the occupation information 35 (indicated by arrow 62).

(Data Structure)

Then, the data structure of the monitoring service information 31, the mirroring communication constitution information 32, the communication log 33, the mirroring path communication record 34, and the occupation information 35 which are explained in FIG. 3 will be explained.

FIG. 4A is a diagram explaining the data structure of the monitoring service information 31 which is explained in FIG. 3, and FIG. 4B is a diagram explaining the data structure of the mirroring communication constitution information 32 which is explained in FIG. 3. The monitoring service information 31 in FIG. 4A is information indicating the contents of the monitoring service, and includes, for example, a service ID, a target tenant, a monitoring point, a mirroring path ID, a start time and an end time, The service ID is identification information of the monitoring service to be set in response to the monitoring service information 31 which is received from the demand reception part 21. In addition, the target tenant is a tenant including the monitoring point for the monitoring, and the monitoring point indicates the virtual machine for the monitoring. In addition, the mirroring path ID is identification information to distinguish the mirroring path in which the mirroring path calculation part 22 calculates in response to the monitoring point. In addition, the start time indicates the start time of the monitoring service, and the end time indicates the end time of the monitoring service.

In an example of the monitoring service information 31 in FIG. 4A, the service ID is "S0001", the target tenant is "the tenant Ta", the monitoring point is "virtual machine va1", and the mirroring path ID is "mp0001". In addition, the start time is "2013/07/31 09:00:00" and the end time is "2013/07/31 10:00:00".

In addition, the mirroring communication constitution information 32 in FIG. 4B is information indicating the mirroring path. The mirroring communication constitution information 32 includes a mirroring path ID, a service ID, the mirroring data acquisition start time, the mirroring data latest acquisition time, constitution SW (switch) information, SW (switch) ID, target communication information in each SW (switch). The mirroring path ID and the service ID are similar to the mirroring path ID and the service ID which is explained with the monitoring service information 31. The mirroring data acquisition start time indicates the start time of the acquisition of the mirror packet, and the mirroring data latest acquisition time indicates the latest time of the acquisition of the mirror packet. In addition, the constitution SW information indicates the identification information of the switch constituting the mirroring path. In addition, the target communication information with each switch of the constitution SW information is information to distinguish a packet for the mirroring in each switch, and, for example, is indicated by the flow ID of the course which identifies the I/O port and the destination and the origin of the packet of the mirroring communication. In the example of FIG. 4, the target communication information with each switch is indicated by the flow ID.

In an example of the mirroring communication constitution information 32 in FIG. 4B, the mirroring path ID is "mp0001", the service ID is "S0001". In addition, the mirroring data acquisition start time is "2013/07/31 09:00:00", which is same as the start time of monitoring service information 31, and, for example, the mirroring data latest acquisition time is "2013/07/31 10:00:00". In addition, the identification information of the switch constituting the mirroring path "mp0001" indicated by the constitution SW information is "vsw11, TOR11, CSW1, TOR21" (as referred to FIG. 1). In addition, for example, the flow ID for the mirroring of the switch vsw11 is "0001, 0002", and the flow ID for the mirroring target of the switch TOR11 is "0301, 0302".

FIG. 5A is a diagram explaining data structure of the communication log 33 in FIG. 3, and FIG. 5B is a diagram explaining data structure of mirroring path communication record 34 which is explained in FIG. 3. The communication log 33 in FIG. 5A is log information of the packets to pass the switch. For example, the communication log 33 includes the sw (switch) ID, the acquisition date and time, the flow ID, a flow condition, monitoring information. The sw ID is identification information to distinguish the switch. In addition, the acquisition date and time indicates the period when the switch acquired the information of the packet. The flow ID is just what illustrated by FIG. 4. The flow condition indicates the course condition of the packet that the flow ID identifies. The monitoring information has the number of packets and quantity of data (byte) during a setting period (sec) of the flow ID.

The communication log 33 in FIG. 5A is an example of the communication log 33 in which the switch vsw11 generated, and the swID is "vsw11". The acquisition date and time is "2013/07/31 from 09:00:00 to 09:00:03". The flow ID "0001" indicates a packet of which an origin of transmission is the virtual machine va1, and the flow ID "0002" indicates a packet in which the destination of transmission is the virtual machine va1. According to the communication log 33, the number of packets of the flow ID "0001" in a period of 4,000 seconds is "287", and the data gross amount of the packet is "3,845" bytes. Similarly, the number of packets of the flow ID "0002" in the period of 4,000 seconds is "205", and the data gross amount of the packet is "3,067" bytes.

In addition, the mirroring path communication record 34 in FIG. 5B is the data which added up the communication log 33 of each switch constituting the mirroring path to a unit during a scheduled period. For example, the mirroring path communication record 34 includes the flow ID, information to distinguish whether it is targeted for mirroring, the communication number of packets in each period. The flow ID is similar to the flow ID indicated in the mirroring communication constitution information 32 and the communication log 33. The information to distinguish whether it is targeted for mirroring indicates whether or not the flow ID is a packet for the monitoring.

The mirroring path communication record 34 in FIG. 5B has the number of packets for every period of the unit for three seconds such as a period for "from 09:00:00 to 09:00:03" and a period "from 09:00:03 to 09:00:06". In addition, according to the mirroring path communication record 34 in FIG. 5B, the flow IDs "0001, 0002, 0301, 0302, 0501, 0502, 0701, 0702" are courses for the mirroring among all flow ID, as illustrated "yes" in FIG. 5B. The details will be mentioned later, but the SDN manager 100 detects the period when only a course packet for the monitoring passes in each switch constituting the mirroring path based on the mirroring path communication record 34 as the occupation.

FIG. 6 is a diagram explaining data structure of occupation information 35 which was explained in FIG. 3. The occupation information 35 in FIG. 6 is information including the occupation which is detected based on the mirroring path communication record 34 in FIG. 5B. For example, the occupation information 35 includes the service ID, the target tenant, the monitoring point, the monitoring period and the occupation. The service ID, the target tenant, and the monitoring point are just what they illustrated by FIG. 4A. The monitoring period indicates the execution period of the monitoring service, and corresponds to the start time and the end time of the monitoring service information 31, for example. The occupation indicates the period when only a course packet for the monitoring passes in each switch constituting the mirroring path.

According to the example of the occupation information 35 in FIG. 6, the tenant targeted for the service ID "S0001" is "tenant Ta", the monitoring point is "virtual machine va1". In addition, a period of the services of the service ID "S0001" is "2013/07/31 from 09:00:00 to 10:00:00". And the occupation of the mirroring path ID "mp0001" is "2013/07/31 from 09:20:30 to 09:20:33, 2013/07/31 from 09:45:42 to 09:45:45".

Then, the processing of the SDN manager 100 will be explained based on a flow chart.

(Flow Chart)

Figure 7:
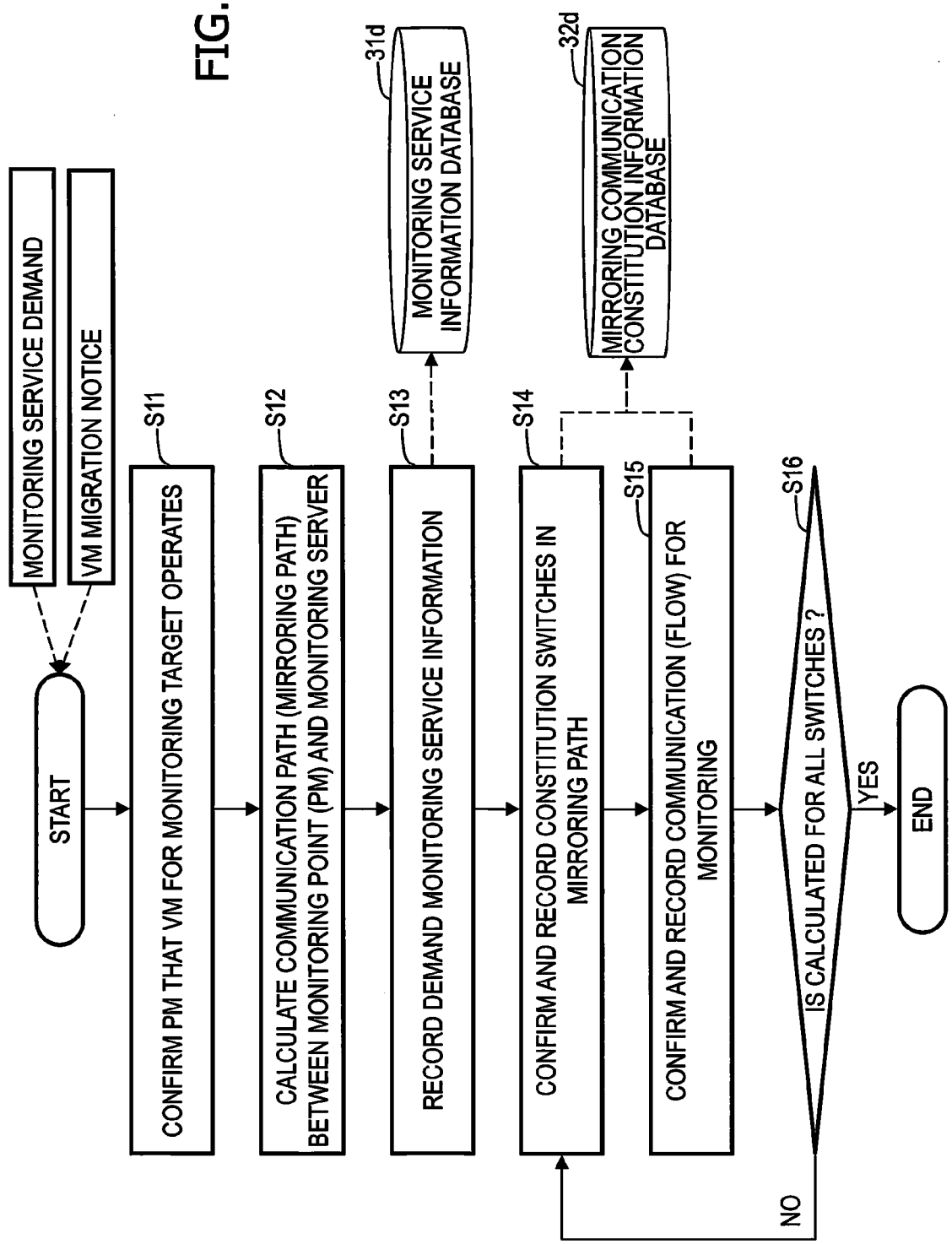
FIG. 7 is a diagram of a flow chart explaining the processing of mirroring path calculation part 22 in the SDN manager 100 according to the embodiment.

FIG. 7 is a diagram of a flow chart explaining the processing of mirroring path calculation part 22 in the SDN manager 100 according to the embodiment. The mirroring path calculation part 22 confirms the physical machine (PM) where the virtual machine (monitoring point) for the monitoring operates based on the mirroring demand (61 in FIG. 3) in which the demand reception part 21 received or the notice (63 in FIG. 3) of the migration of the virtual machine (S11). The mirroring path calculation part 22 calculates a communication path (mirroring path) between the monitoring point and the monitoring server PM2n next (S12). The calculation process of the mirroring path will be mentioned later based on a diagram of different flow chart. The mirroring path calculation part 22 stores the monitoring service information 31 inputted from the demand reception part 21 in the monitoring service information database DB31d (S13).

Then, the mirroring path calculation part 22 identifies the information (corresponding to the constitution switch information in FIG. 4) of each switch constituting the mirroring path and stores it in the mirroring communication constitution information database DB32d (S14). In addition, the mirroring path calculation part 22 confirms the flow ID of the packet for the mirroring among the courses (flow ID) of the packet in which each switch constituting the mirroring path handles and stores it in the mirroring communication constitution information database DB32d (S15). When the mirroring path calculation part 22 stores all switches constituting the mirroring path in the mirroring communication constitution information database DB32d (YES/S16), the mirroring path calculation part 22 finishes the process.

Figure 8:
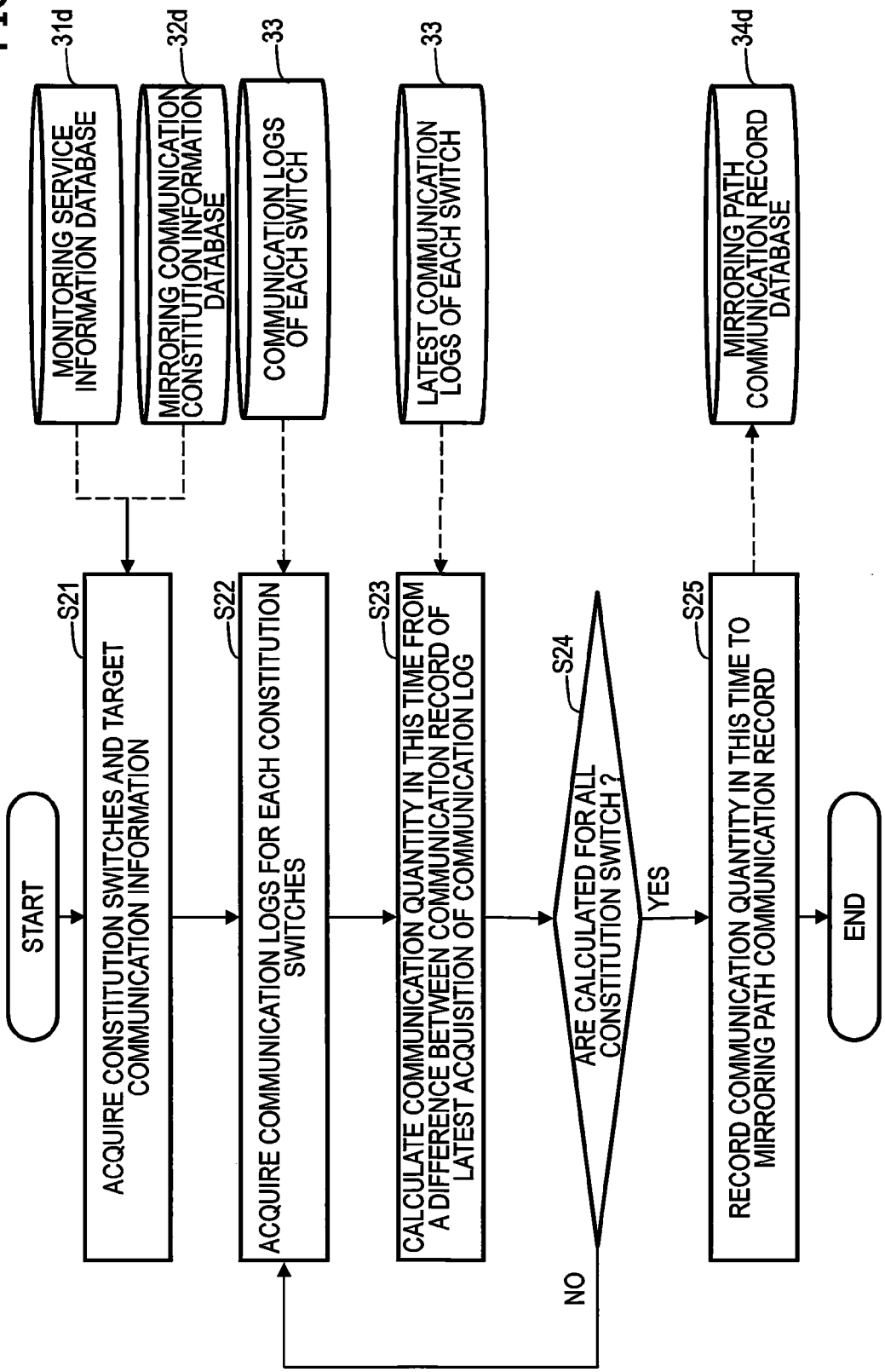
FIG. 8 is a diagram of flow chart explaining processing of the communication result collection part 24 in the SDN manager 100 according to the embodiment.

FIG. 8 is a diagram of flow chart explaining processing of the communication result collection part 24 in the SDN manager 100 according to the embodiment. The communication result collection part 24 carries out the process in the flow chart of FIG. 8 regularly, according to the space of the predetermined period. For example, in the embodiment, the predetermined period is three seconds.

At first, the communication result collection part 24 acquires the ID of the switch which constitutes the mirroring path and the flow ID for the mirroring target in each switch, based on the monitoring service information database DB31d (referring to FIG. 4A) and the mirroring communication constitution information database DB32d (referring to FIG. 4B) (S21). The communication result collection part 24 acquires the communication log 33 (referring to FIG. 5A) of each switch which constitutes the mirroring path, through the SDN controller 200 next (S22). And the communication result collection part 24 calculates the communication quantity (for example, number of packets) in this time, based on a difference with the communication log 33 which is acquired last time (S23). When the process S22 and the process S23 are performed about all switches constituting the mirroring path (S24/YES), the communication result collection part 24 stores the communication quantity in this time in the mirroring path communication record database DB34d (S25).

Figure 9:
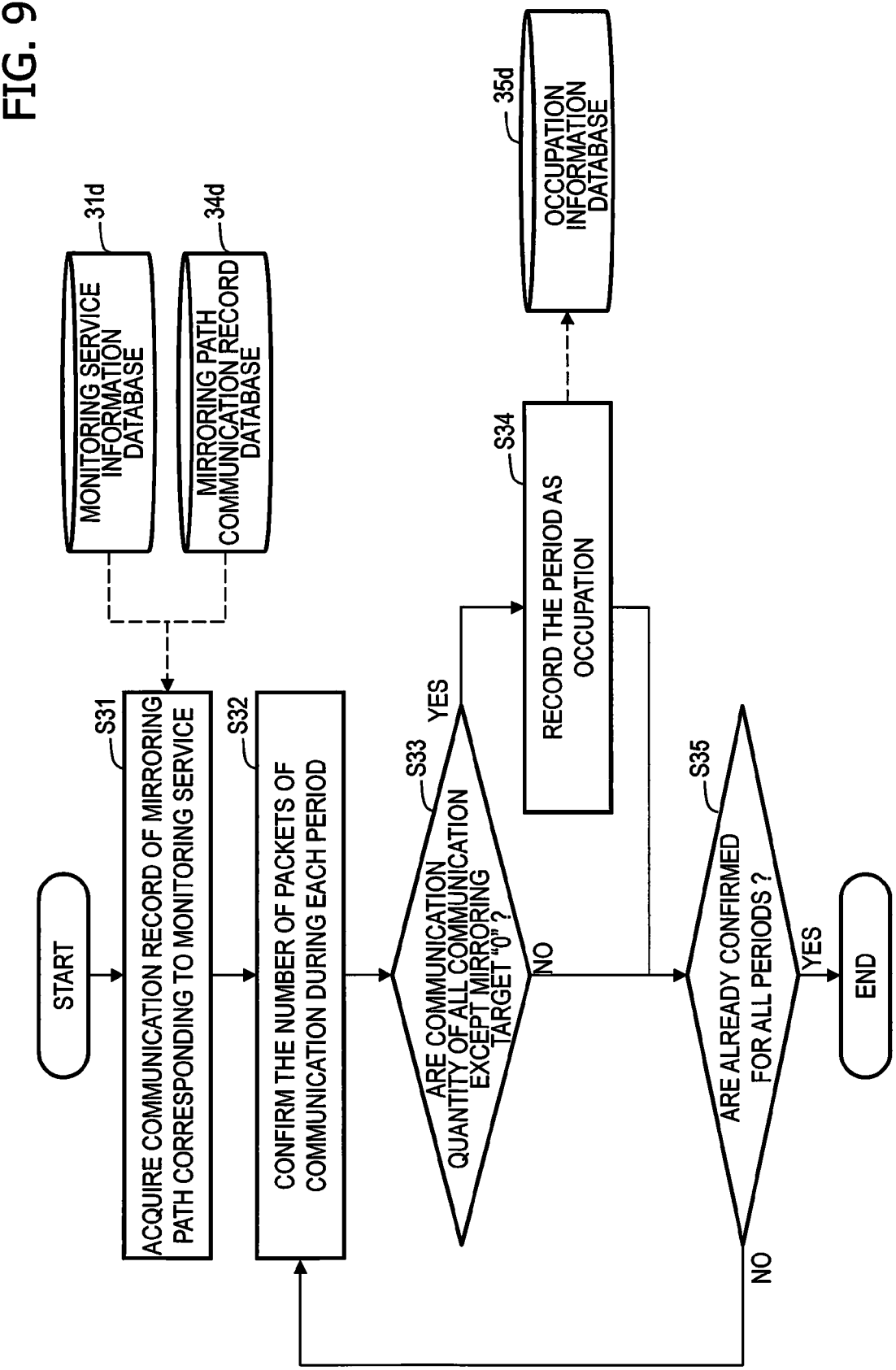
FIG. 9 is a diagram of flow chart explaining processing of the occupation specific part 25 in the SDN manager 100 according to the embodiment.

FIG. 9 is a diagram of flow chart explaining processing of the occupation specific part 25 in the SDN manager 100 according to the embodiment. The occupation specific part 25 processes the flow chart in FIG. 9 at the time of the end of the monitoring service.

Firstly, the occupation specific part 25 acquires the mirroring path communication record 34 of the mirroring path corresponding to the monitoring service with reference to the monitoring service information database DB31d and the mirroring path communication record DB34d (S31). Then the occupation specific part 25 identifies quantity of communication (number of packets) for each period (in the embodiment, for every three seconds) (S32). The occupation specific part 25 judges whether or not the communication quantity (number of packets) of the communication except the mirroring object in the target period is "0" (S33).

When the occupation specific part 25 judges that the communication quantity (number of packets) of the communication except the mirroring object in the target period is "0", the occupation specific part 25 detects the period concerned as the occupation and stores it in the occupation information database DB35d (S34). In other words, the occupation specific part 25 detects the period concerned as the occupation when the communication quantity of the course except the course indicating the transfer of the mirror packet in the target period is "0". In other words, the occupation specific part 25 detects the period when the mirror packet occupies the mirroring pass as the occupation. When the occupation specific part 25 performs the process S32-S34, about all periods targeted for the monitoring service (YES/S35), the occupation specific part 25 finishes the processing.

Next, the processing of the SDN manager 100 which is explained in FIG. 7-FIG. 9 will be explained based on a specific example.

(Specific Example)

Figure 10:
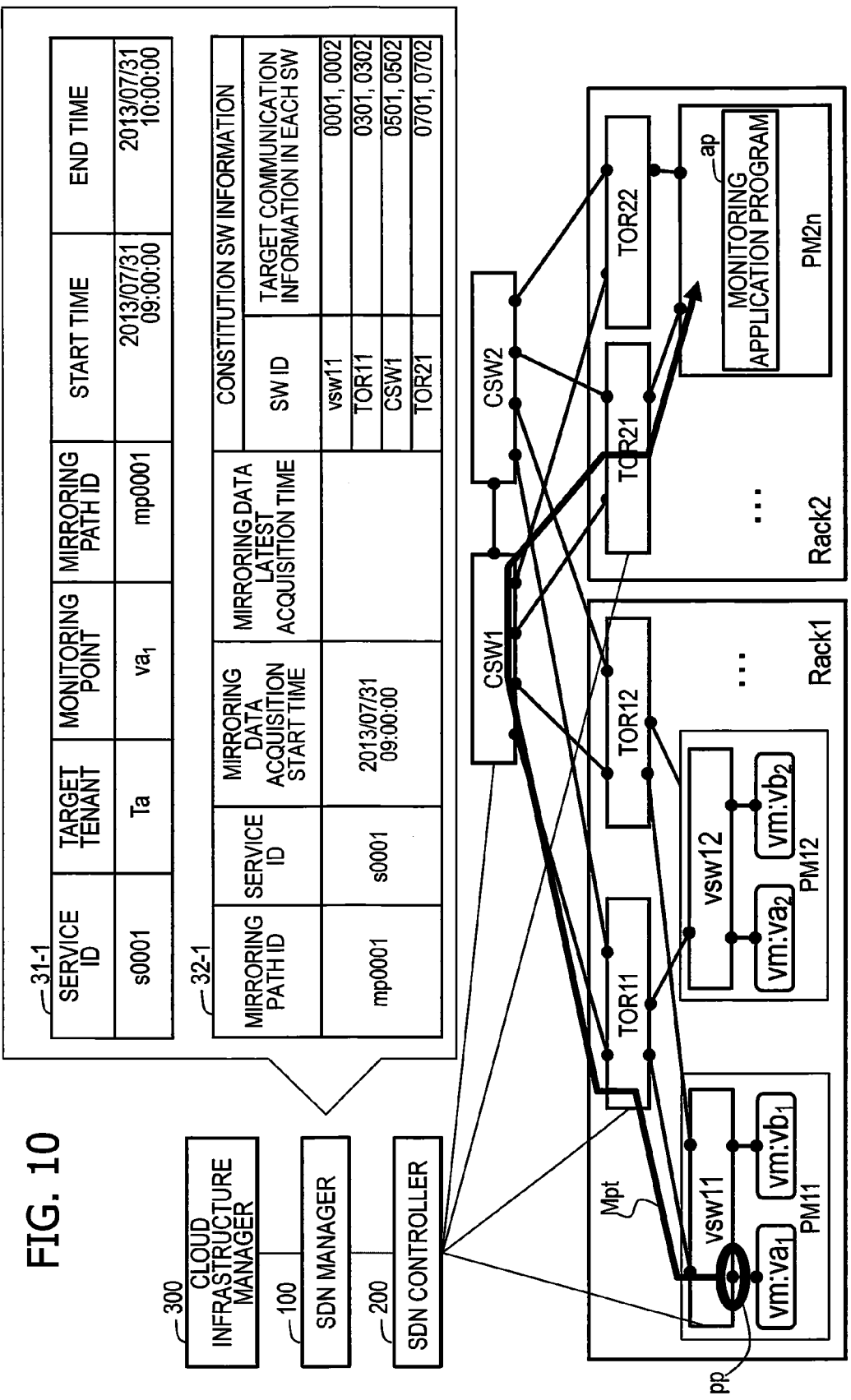
FIG. 10 is a diagram explaining the mirroring path in the specific example according to the embodiment.

FIG. 10 is a diagram explaining the mirroring path in the specific example according to the embodiment. In the embodiment, the demand reception part 21 receives a start demand 61 of the monitoring service, for example, of which the monitoring point pp is the virtual machine va1 and the monitoring period is "2013/07/31 from 0900:00 to 10:0000", from the user of the tenant. Then the mirroring path calculation part 22 calculates the mirroring path Mpt between the monitoring point "the virtual machine va1" and the monitoring server PM2n (S12).

And the mirroring path calculation part 22 stores the monitoring service information 31-1 which was input from the demand reception part 21 in the monitoring service information database DB31d (S13). The monitoring service information 31-1 depicted by FIG. 10 includes the service ID "S0001", the target tenant "tenant Ta", the monitoring point "virtual machine va1", the mirroring path MptID "mp0001", the start time "2013/07/31 09:00:00" and the end time "2013/07/31 10:00:00".

Then, the mirroring path calculation part 22 confirms constitution switch information "the switch vsw11-the switch TOR11-the switch CSW1-the switch TOR21" which constitutes the mirroring path Mpt and stores it in the mirroring communication constitution information database DB32d (S14 in FIG. 7). In addition, the mirroring path calculation part 22 confirms the communication information targeted for each switch which constitutes the mirroring path Mpt and stores it in the mirroring communication constitution information database DB32d (S15). For example, among the courses of the packet in which the switch vsw11 processes, the course of the packet targeted for the mirroring is the flow ID "0001, 0002" (not illustrate in FIG. 10). The flow ID "0001" indicates a packet of which an origin of transmission is the virtual machine va1, and the flow ID "0002" indicates a packet of which an address (destination) is the virtual machine va1.

Therefore, the mirroring communication constitution information 32-1 depicted by FIG. 10 includes the mirroring path MptID "mp0001", the service ID "S0001", the mirroring data acquisition start time "2013/07/31 09:00:00" and the constitution switch ID "vsw11, TOR11, CSW1, TOR21" as the constitution switch information. In addition, the mirroring communication constitution information 32-1 has information (target communication information) of the flow ID of the packet targeted for the monitoring to every each switch.

Then, the course change instruction part 23 distributes a flow which realizes the mirroring path Mpt "mp0001", to the switch "vsw11, TOR11, CSW1, TOR21" which constitute the mirroring path Mpt, through the SDN controller 200. Thereby, the switch vsw11 performs the mirroring of packets of the flow ID "0001, 0002" and transfers it to the switch TOR11. In other words, the switch vsw11 performs the mirroring of the packet in the course where the virtual machine va1 is an origin or an address (destination) of the transmission, and transfers it to the switch TOR11.

In addition, the switch TOR11 transfers the packet of the course of flow ID "0301, 0302" to the switch CSW1. The flow ID "0301" indicates the flow ID "0001" of the mirror packet transferred by the switch vsw11, and the flow ID "0302" indicates the flow ID "0002" of the mirror packet transferred by the switch vsw11. Similarly, the switch CSW1 transfers the packet of the course of flow ID "0501, 0502" to the switch TOR21. The flow ID "0501" indicates the flow ID "0301" of the mirror packet transferred by the switch TOR11, and the flow ID "0502" indicates the flow ID "0302" of the mirror packet transferred by the switch TOR11.

Similarly, the switch TOR21 transfers the packet of the course of the flow ID "0701, 0702" transferred by the switch CSW11 to the monitoring server PM2n. Thereby, a packet for the monitoring arrives at the monitoring server PM2n.

Figure 11:
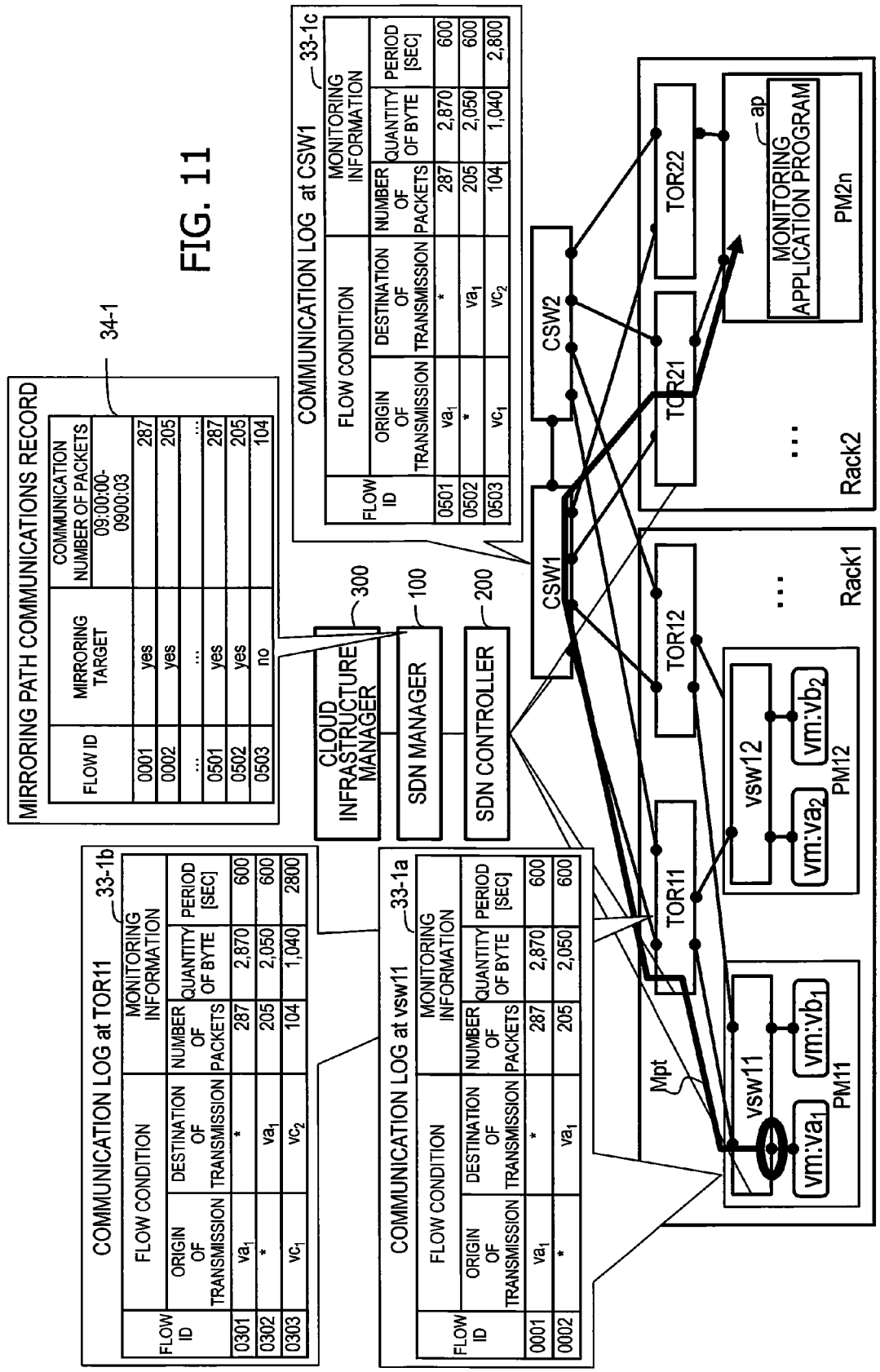
FIG. 11 is a first acquisition diagram explaining the specific example according to the embodiment.

FIG. 11 is a first acquisition diagram explaining the specific example according to the embodiment. In the embodiment, the communication result collection part 24 in the SDN manager 100 acquires the flow ID "0001, 0002, 0301, 0302, 0501, 0502, 0701, 0702" targeted for the monitoring of the switches "vsw11, TOR11, CSW1, TOR21" (S21 in FIG. 8). In addition, the communication result collection part 24 acquires the communication log 33 (FIG. 5) of the switches "vsw11, TOR11, CSW1, TOR21" through the SDN controller 200 for every three seconds, for example (S22).

FIG. 11 illustrates the communication log 33-1a-33-1c which are the communication logs 33 of each switch which are acquired during a period "from 09:00:00 to 09:00:03". According to the communication log 33-1a of the switch vsw11, the number of packets of flow ID "0001" is "287" and the number of packets of flow ID "0002" is "205" during 600 seconds, "from 09:00:00 to 09:00:03". In addition, according to the communication log 33-1b of the switch TOR11, the number of packets of flow ID "0301" is "287" and the number of packets of flow ID "0302" is "205" during a period 600 seconds, "from 09:00:00 to 09:00:03". In addition, the number of packets of flow ID "0303" in 2,800 seconds, is "104" at "from 09:00:00 to 09:00:03". In addition, as same as, other switches have information of the number of packets at "from 09:00:00 to 09:00:03" in every flow ID.

Figure 12:
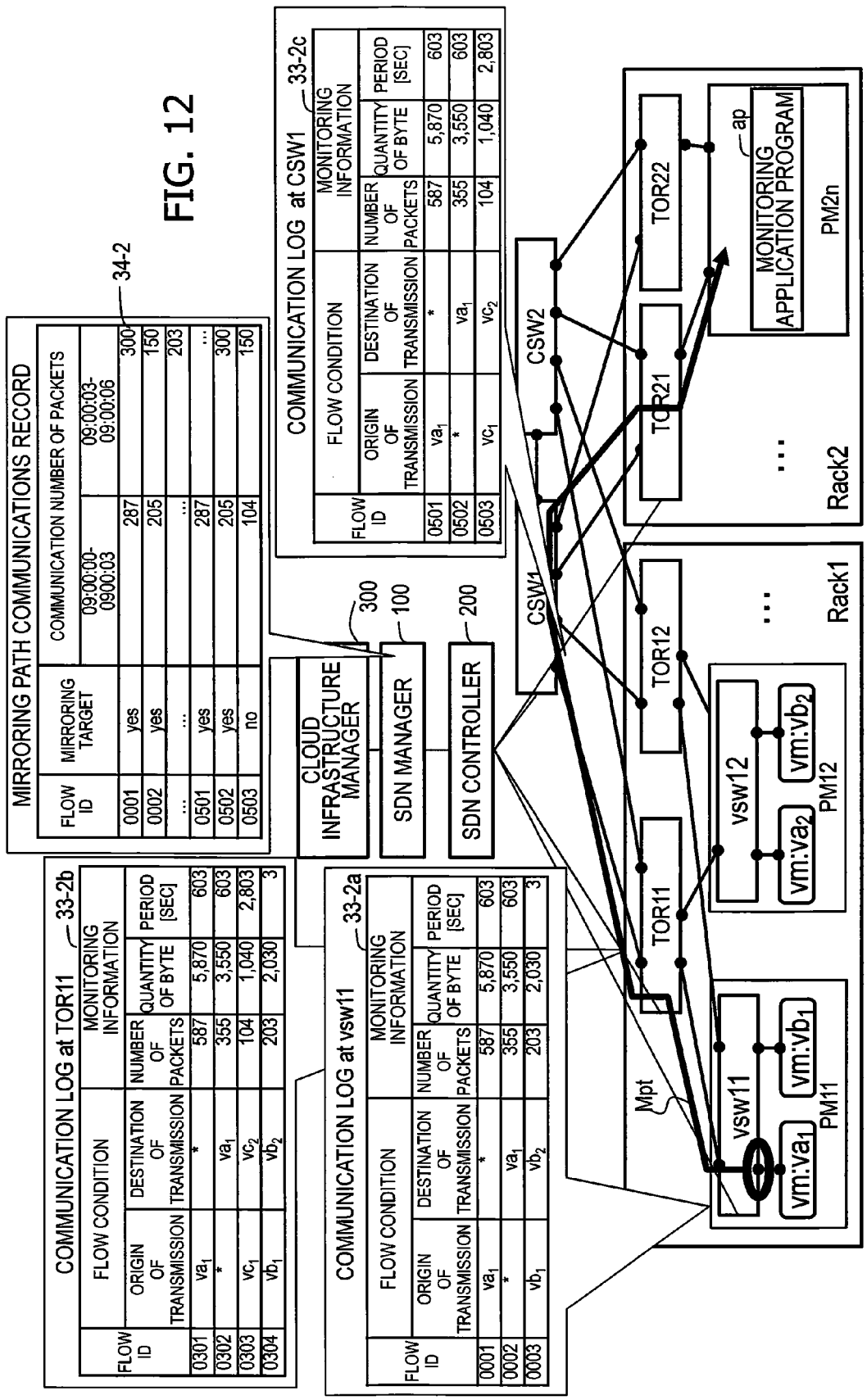
FIG. 12 is a second acquisition diagram explaining the specific example according to the embodiment.

FIG. 12 is a second acquisition diagram explaining the specific example according to the embodiment. FIG. 12 illustrates the communication logs 33-2a-33-2c of each switch which are acquired after three seconds at a period "from 09:00:03 to 09:00:06". For example, according to the communication log 33-2a of the switch vsw11, the number of packets of flow ID "0001" is "587" and the number of packets of flow ID "0002" is "355" during 603 seconds, at "from 09:00:03 to 09:00:06". In addition, according to the communication log 33-2a, the number of packets of flow ID "0301", which indicates the course of which the virtual machine vb1 is an origin and a destination of the transmission, is "203" during a period 3 seconds, at "from 09:00:03 to 09:00:06".

Therefore, the communication result collection part 24 calculates the number of packets "300" (=587−287) of flow ID "0001", the number of packets "150" (=355−205) of flow ID "0002", and the number of packets "203" of flow ID "0003" in period "from 09:00:03 to 09:00:06" (S23 in FIG. 8). In addition, the communication result collection part 24 calculates the number of packets 300 (=587−287) of flow ID "0301", the number of packets "150" (=355−205) of flow ID "0302", the number of packets "0" (=104−104) of the flow ID "0303" and the number of packets "203" of flow ID "0304" in period "from 09:00:03 to 09:00:06" (s23).

The communication result collection part 24 calculates the number of packets during the period "from 09:00:03 to 09:00:06" about other switches equally (S23). And the communication result collection part 24 generates the mirroring path communication record 34-2 indicated by FIG. 12 which is added the information of the period "from 09:00:03 to 09:00:06" (S25).

FIG. 13 is a diagram explaining the mirroring path communication record 34 in the specific example. The occupation specific part 25 identifies the occupation based on the generated mirroring path communication record 34-3 after the monitoring period of the monitoring service "S0001" (S31-S34 in FIG. 9). As described above, the occupation specific part 25 detects the period, in which quantity of communication of the course (a mirroring object "NO") except the course indicating the transfer of the mirror packet is 0, as the occupation.

According to the mirroring path communication record 34-3 in FIG. 13, the period, in which the number of packets of the flow ID which the mirroring target is "NO" is all 0, is periods "from 09:20:30 to 09:20:33" and "from 09:45:42 to 09:45:45". That is, the periods "from 09:20:30 to 09:20:33" and "from 09:45:42 to 09:45:45" indicate the periods in which packets of the flow ID, of which the mirroring target is "YES", occupied the mirroring path. Therefore, the occupation specific part 25 detects the occupation "from 09:20:30 to 09:20:33, from 09:45:42 to 09:45:45".

FIG. 14 is a diagram indicating the occupation information 35-1 in the specific example. The occupation information 35-1 includes "2013/07/31 from 09:20:30 to 09:20:33, 2013/07/31 from 09:45:42 to 09:45:45" during the monitoring period "2013/07/31 from 09:00:00 to 10:00:00" of the monitoring service "S0001". The reply part 26 in the SDN manager 100 notifies the occupation 62 which is detected to the user Tu of the tenant, for example. And the user Tu of the tenant instructs the monitoring based on the mirror packet in the occupation to the monitoring server PM2n. The monitoring server PM2n monitors the delay and the lost of the packet based on the packet which is received and transmitted during the occupation.

In addition, in the embodiment, the communication result collection part 24 in the SDN manager 100 collects the communication log 33 at every scheduled measurement interval (in this example, every three seconds). However, it is not a thing limited to this example. The communication result collection part 24 may collect the communication log 33 for a plurality of measurement periods in a mass. For example, in the case of three seconds as the measurement time, the communication result collection part 24 may acquire the communication log 33 for 20 times in a mass every one minute. Or the communication result collection part 24 may acquire the communication log 33 during a period targeted for the monitoring service at the time of the end of the monitoring period of the monitoring service in a mass.

As above described, the acquisition method of the packet according to the embodiment, has a control process that a control unit (SDN manager) 100 forms a mirror path for arriving a mirror packet, of which a origin or a destination of a transmission is a virtual machine for the monitoring target (for example, a virtual machine va1), at a monitoring device (monitoring server PM2a) which monitors the mirror packet through one or more relay devices (switches). In addition, the acquisition method of the packet has a detection process that the control unit detects the occupation in which the packet except the packet, of which an origin and a destination of the transmission is the virtual machine for the monitoring, does not pass based on the history information of the packet which passes the relay device. In addition, a monitor accumulates it, and the acquisition method of the packet has an accumulation process of the mirror packet that arrived at, and an extraction process to extract the mirror packet that arrived at in the occupation as a packet for the monitoring among the mirror packets that accumulated.

In this way, according to the packet acquisition method in the embodiment, the SDN manager 100 controls to arrive the mirror packet of the virtual machine for the monitoring at the monitoring server PM2n through one or more switches. Thereby, it is possible to accumulate a packet for the monitoring in the monitoring server without affecting the performance of the virtual machine for the monitoring. In addition, it is possible that the monitoring server PM2n accumulates packets continuously even if the migration occurs, because the mirror packet of the virtual machine for the monitoring arrives at the monitoring server PM2n.

In addition, the SDN manager 100 detects the period in which only a mirror packet passed one or more switches of which the mirror packet goes by way of, based on the communication log 33 of the switches constituting the mirroring path, as the occupation. In other words, the SDN manager 100 detects the occupation when the mirror packet occupied the mirroring path Mpt, and the monitoring server PM2n targets only the mirror packet during the occupation for the monitoring. Thereby, it is possible to exclude the mirror packet included in the period when a delay of the transmission and reception time of the mirror packet occurs, for the monitoring target.

Therefore, it is possible to realize the monitoring processing based on the packet having the correct transmission and reception time which is not affected by the packet of other virtual machine, even if transferring the packet of the virtual machine for the monitoring to the monitoring server PM2n. Therefore, it is possible that the user of the tenant realize the monitoring process of the communication and analysis process based on the packet of the precision like the on-premises environment.

In addition, according to the acquisition process of packet in the embodiment, because it is possible to acquire a mirror packet not to be affected by the noise, the company of the cloud system does not have to add individual network environment for the transfer of mirror packets from the monitoring point to the monitoring server PM2n, for each tenant. Therefore, it is possible that the company of the cloud system provides low-cost and appropriate monitoring service without affecting the performance of the virtual machine which is provided as a tenant.

In addition, according to the acquisition method of the packet in the embodiment, the history information of the packet has the data quantity of the packet to a course unit having the origin and the destination of the transmission of the packet. And, the detection process detects the period, in which the packet quantity of the course except the course where the virtual device for the monitoring is an origin or a destination of the transmission is "0", based on the history information of the packet, as the occupation. Thereby, it is possible to detect the occupation in which the mirror packet occupied the mirroring path, based on the communication log of each switch.

In addition, according to the acquisition method of the packet in the embodiment, the history information of the packet has the data quantity of the packet every scheduled unit period. And the detection process detects the period, in which the packet quantity of the course except the course where the virtual device for the monitoring is an origin or a destination of the transmission is "0", as the occupation. Thereby, it is possible to identify the occupation corresponding to the unit period, because based on the communication log of the switch every unit period.

Here, the decision method of the mirroring path will be explained.

(Decision Process of Mirroring Path)

Figure 15:
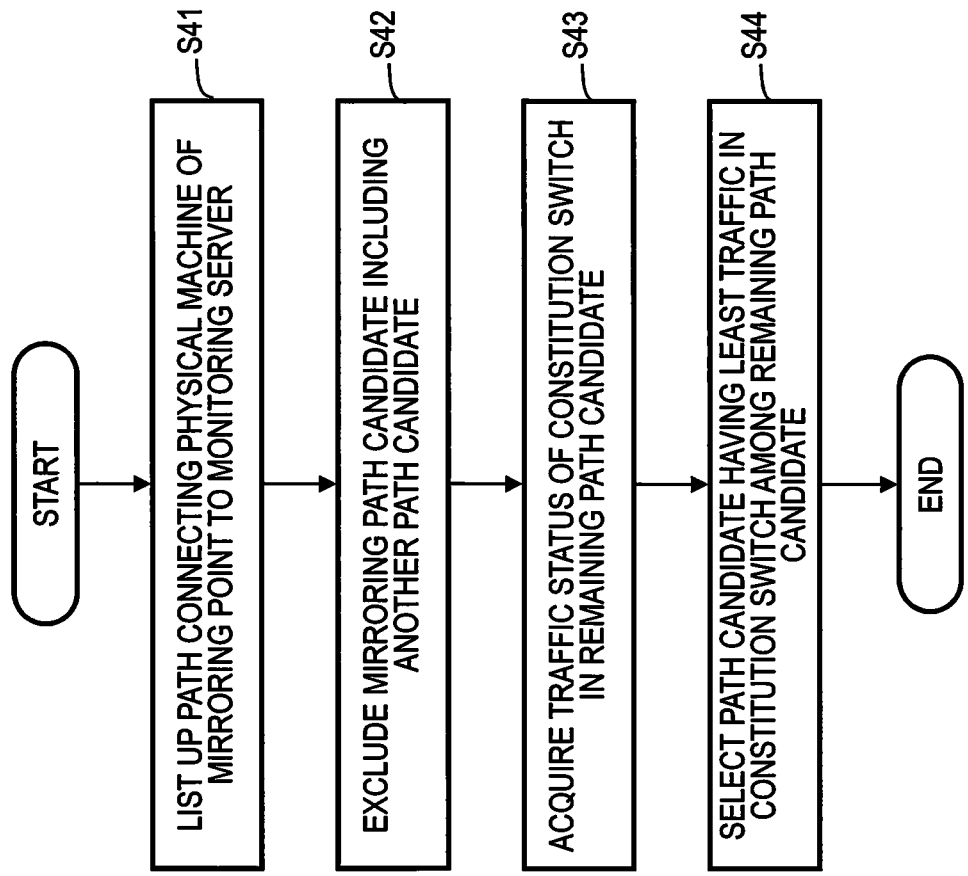
FIG. 15 is a diagram of flow chart explaining the decision process of mirroring path.

FIG. 15 is a diagram of flow chart explaining the decision process of mirroring path. The mirroring path calculation part 22 in the SDN manager 100 lists all candidate of the mirroring path to connect the physical machine that the virtual machine for the monitoring is located with the monitoring server PM2n (S41). Then, the mirroring path calculation part 22 excludes the candidate of the mirroring path including candidate of the different mirroring path among the mirroring path candidates which are listed (S42).

Next, the mirroring path calculation part 22 acquires the traffic situation of the switch constituting the mirroring path candidate which is remained (S43). The traffic situation is, for example, the quantity of communication of predetermined time distance. And the mirroring path calculation part 22 selects the candidate of mirroring path, of which there is the least traffic in each switch that constitutes the mirroring path candidate, as a mirroring path (S44). The mirroring path with a least traffic in each switch indicates, for example, a mirroring path that there is the least gross weight of the communication quantity with each switch to constitute or a mirroring path that there is the most number of times of the measurement period (for example, three seconds) in which the communication quantity in all switches are "0".

Figure 16:
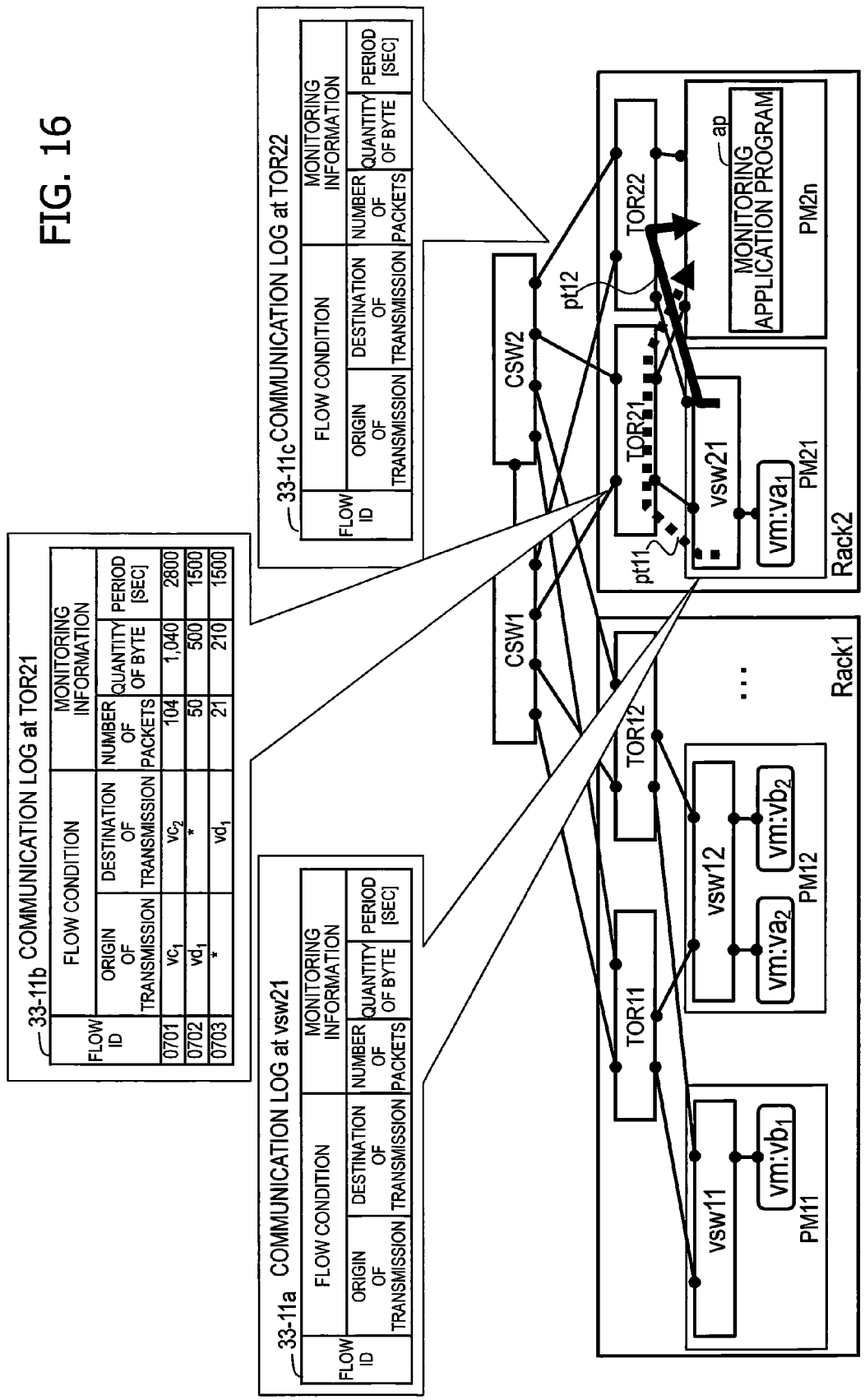
FIG. 16 is a diagram explaining a specific example of the decision process of the mirroring path.

FIG. 16 is a diagram explaining a specific example of the decision process of the mirroring path. In the embodiment, the mirroring path calculation part 22 lists five mirroring path candidates (S41 in FIG. 15). That is, five mirroring path candidates includes a mirroring path candidate A (vsw21-TOR21), a mirroring path candidate B (vsw21-TOR22), a mirroring path candidate C (vsw21-TOR21-CSW1-TOR22), a mirroring path candidate D (vsw21-TOR21-CSW2-TOR22), and a mirroring path candidate E (vsw21-TOR21-CSW1-CSW2-TOR22).

The mirroring path candidate C includes the mirroring path candidate A. In addition, the mirroring path candidate D includes the mirroring path candidate B. In addition, the mirroring path candidate E includes the mirroring path candidates A-D. Therefore, the mirroring path calculation part 22 excludes the mirroring path candidates C, D, E among the mirroring path candidates, as mirroring path candidates including other mirroring path candidates (S42). Then, the mirroring path calculation part 22 selects a mirroring path among the mirroring path candidate A (vsw21-TOR21) pth11 and the mirroring path candidate B (vsw21-TOR22) pth12.

According to the communication log 33-11a of the switch vsw21 in FIG. 16, the quantity of communication of the switch vsw21 is "0". In addition, according to the communication log 33-11c of the switch TOR22 in FIG. 16, the quantity of communication of the switch TOR22 is "0". Therefore, the mirroring path calculation part 22 selects the mirroring path candidate B (vsw21-TOR22) pth12 as the mirroring path that there is the least gross weight of the communication quantity with each switch that constitutes the mirroring path or the mirroring path that there is the most number of times during the measurement period of which the communication quantity in all switches constituting the mirroring path is "0" (S43, S44 in FIG. 15).

In this way, the control process of the acquisition method of the packet in the embodiment detects a plurality of relay path candidates indicating one or more relay devices which connect the monitoring device to the virtual machine for the monitoring. And the control process selects the relay path candidate that there is the least quantity of total data of the packet to pass, or the relay path candidate having a longest period when the packet does not pass, as a relay path among the plurality of relay path candidates and controls the relay device included in the relay path. Thereby, it is possible to detect a mirroring path (the course that connects the monitoring device to the virtual machine for the monitoring) which identifies the longer occupation.

(Second Embodiment)

In the second embodiment, a case which occurs the migration of the virtual machine for the monitoring during the period of the monitoring service will be exemplified. When the migration of the virtual machine for the monitoring occurs, the SDN manager 100 specifies the monitoring point after the migration and calculates a mirroring path again. And the SDN manager 100 instructs a course change to each switch constituting the mirroring path through the SDN controller 200. In addition, the SDN manager 100 detects the occupation before and after the occurrence of the migration in each period.

Figure 17:
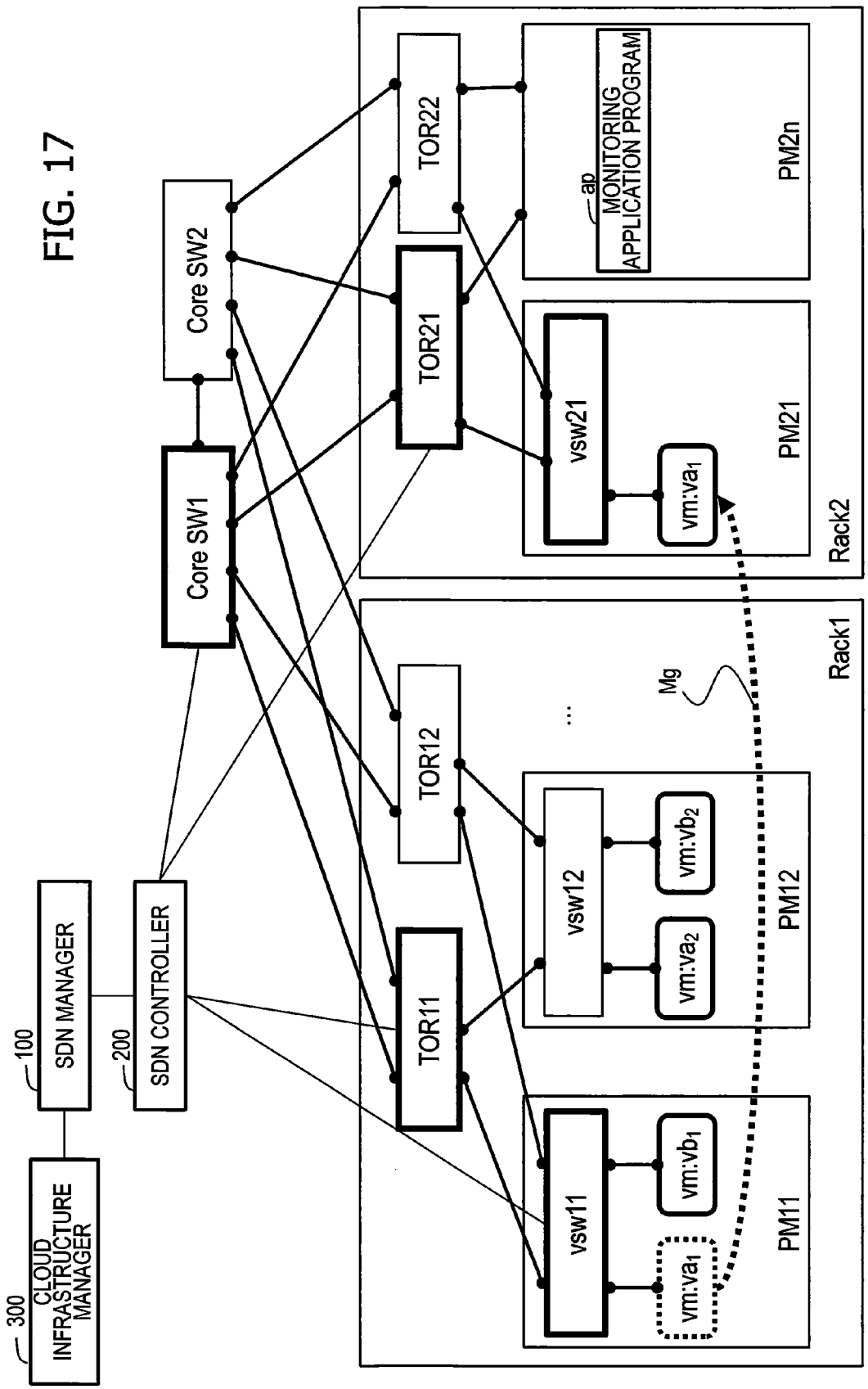
FIG. 17 is a diagram explaining an example of the second embodiment.

FIG. 17 is a diagram explaining an example of the second embodiment. In FIG. 17, same elements as that in FIG. 1 are marked by same references. According to FIG. 17, by occurrence of the migration Mg, the virtual machine va1 moves to the physical machine PM21 in the rack server Rack2 from the physical machine PM11 in the rack server Rack1. In this way, the physical machine that the virtual machine which is a monitoring point operates may change after the start of the monitoring service, because the constitution of the system dynamically changes in the cloud system. Therefore, depending on the occurrence of the migration Mg, the mirroring path changes, too.

Figure 18:
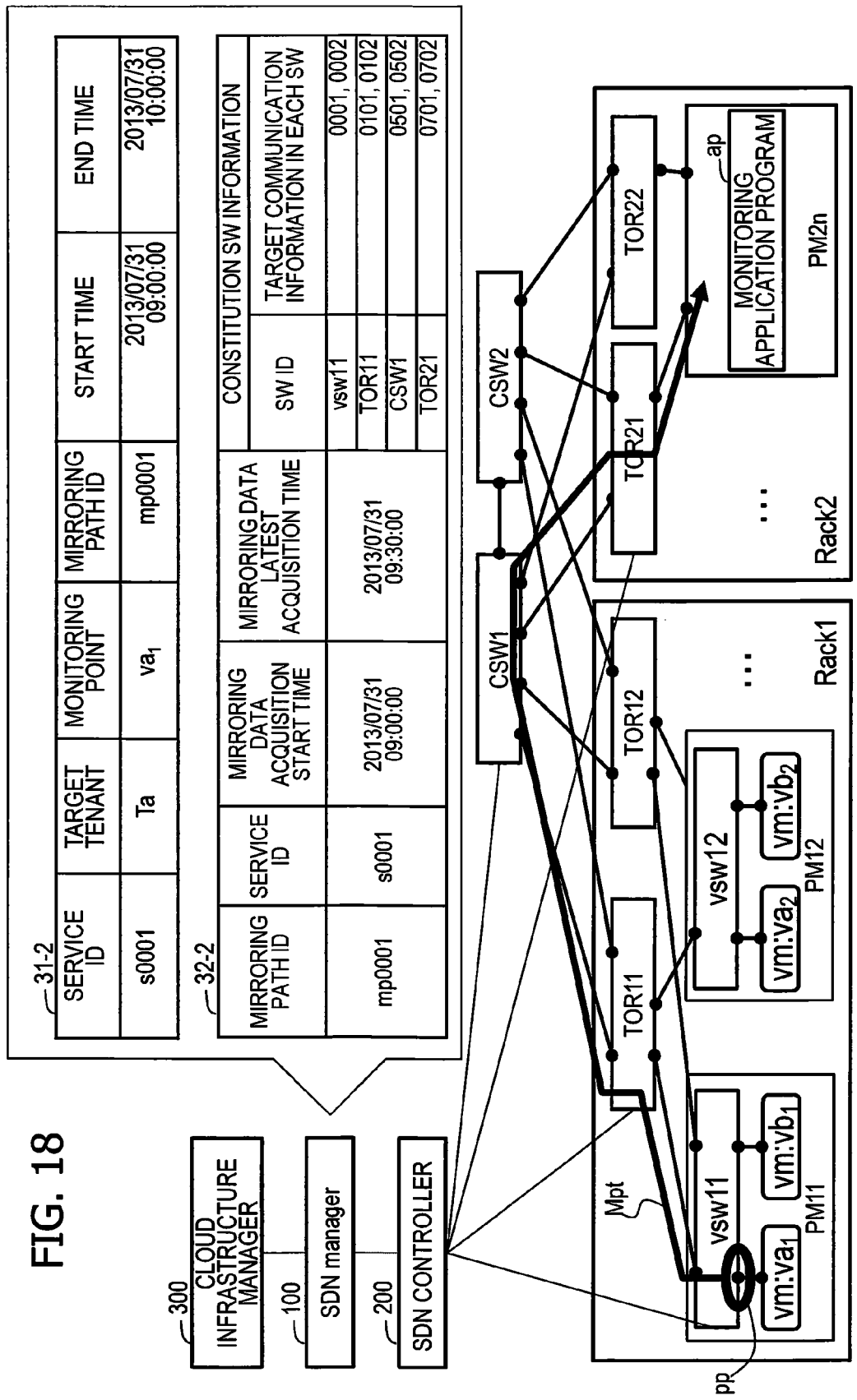
FIG. 18 is a diagram explaining a mirroring path in the specific example according to second embodiment.

FIG. 18 is a diagram explaining a mirroring path in the specific example according to second embodiment. The system constitution at the time of the monitoring service start and the contents of the monitoring service are similar to that in the first enforcement described in FIG. 1. Therefore, the monitoring service information 31-2, and the mirroring communication constitution information 32-1 are similar to that in the first embodiment depicted by FIG. 10. In other words, the monitoring point is the virtual machine va1, and the monitoring period is "2013/07/31 from 09:00:00 to 10:00:00". In addition, the mirroring path Mpt1 is path of "switch vsw11-switch TOR11-switch CSW1-switch TOR21".

FIG. 19 is a diagram explaining the mirroring path communication record 34-2 of mirroring path "mp0001" Mpt1 before the occurrence of the migration in the specific example according to the second embodiment. In FIG. 19, the mirroring path communication record 34-2 has information until just before "2013/07/31 09:30:00" at the occurrence time of the migration Mg from "2013/07/31 09:00:00" at the start time of the monitoring service.

Figure 20:
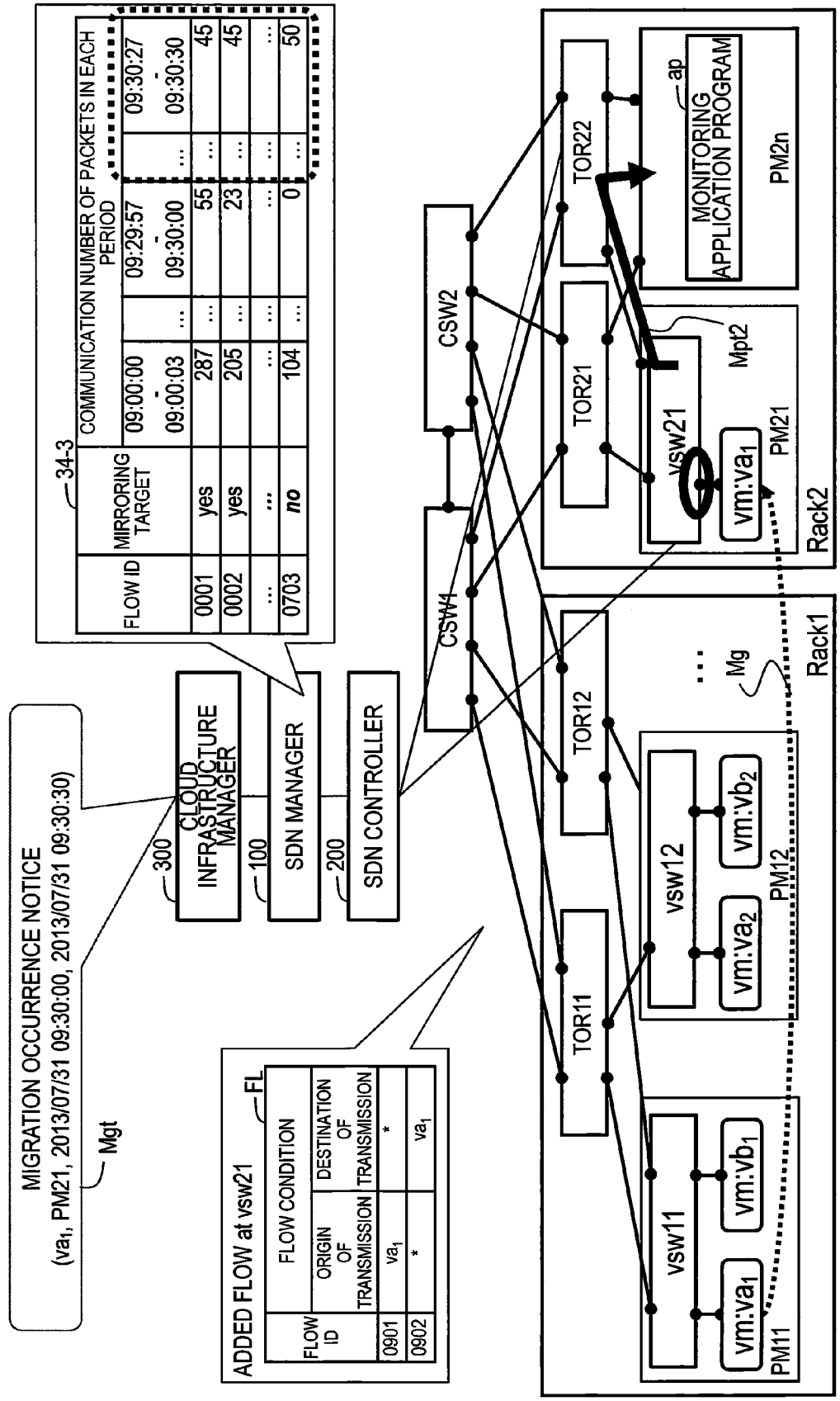
FIG. 20 is a diagram explaining the migration in the specific example according to the second embodiment.

FIG. 20 is a diagram explaining the migration in the specific example according to the second embodiment. FIG. 20 is the diagram explaining processing at the occurrence time of the migration Mg. In an example of the second embodiment, the migration Mg occurs at the time "2013/07/31 09:30:00". By the occurrence of the migration Mg, the physical machine that the virtual machine va1 operates moves to the physical machine PM21 in the rack server Rack2 from the physical machine PM11 in the rack server Rack1.

Specially, the cloud infrastructure manager 300 performs, for example, the migration Mg of the virtual machine and updates the communication path with the migration Mg. In addition, the cloud infrastructure manager 300 transmits the migration occurrence notice Mgt to the SDN manager 100 at the time of completion of the migration Mg. The migration occurrence notice Mg, for example, includes the virtual machine for the migration target, the shift destination of the migration, the start time of the migration, and the end time of the migration. Specially, the cloud infrastructure manager 300 transmits the migration occurrence notice Mgt (for example, the virtual machine for the migration "va1", shift destination of the virtual machine "PM21", the migration start time "2013/07/31 09:30:00" and the migration end time "2013/07/31 09:30:30") to the SDN manager 100.

Further, the monitoring service information 31 at the time of the occurrence of the migration is similar to the monitoring service information 31-2 before the occurrence of the migration depicted by FIG. 18. In addition, at the time of occurrence of the migration, the mirroring path calculation part 22 updates the mirroring data latest acquisition time in the mirroring communication constitution information 32-2 (referring to FIG. 18) at the time "2013/07/31 09:30:30" and adds the information of mirroring path ID "mp0002" to the mirroring communication constitution information 32-2. In addition, the switch vsw21 has flow ID "0901, 0902" FL newly. The origin of transmission for the flow ID "0901" is a course of the virtual machine va1, and, the destination for the flow ID "0902" is a course of the virtual machine va1. In addition, as illustrated in FIG. 20, the communication result collection part 24 adds information of the communication quantity for the period "from 09:30:00 to 09:30:30" until the completion of the migration, to the mirroring path communication record 34-3.

Figure 21:
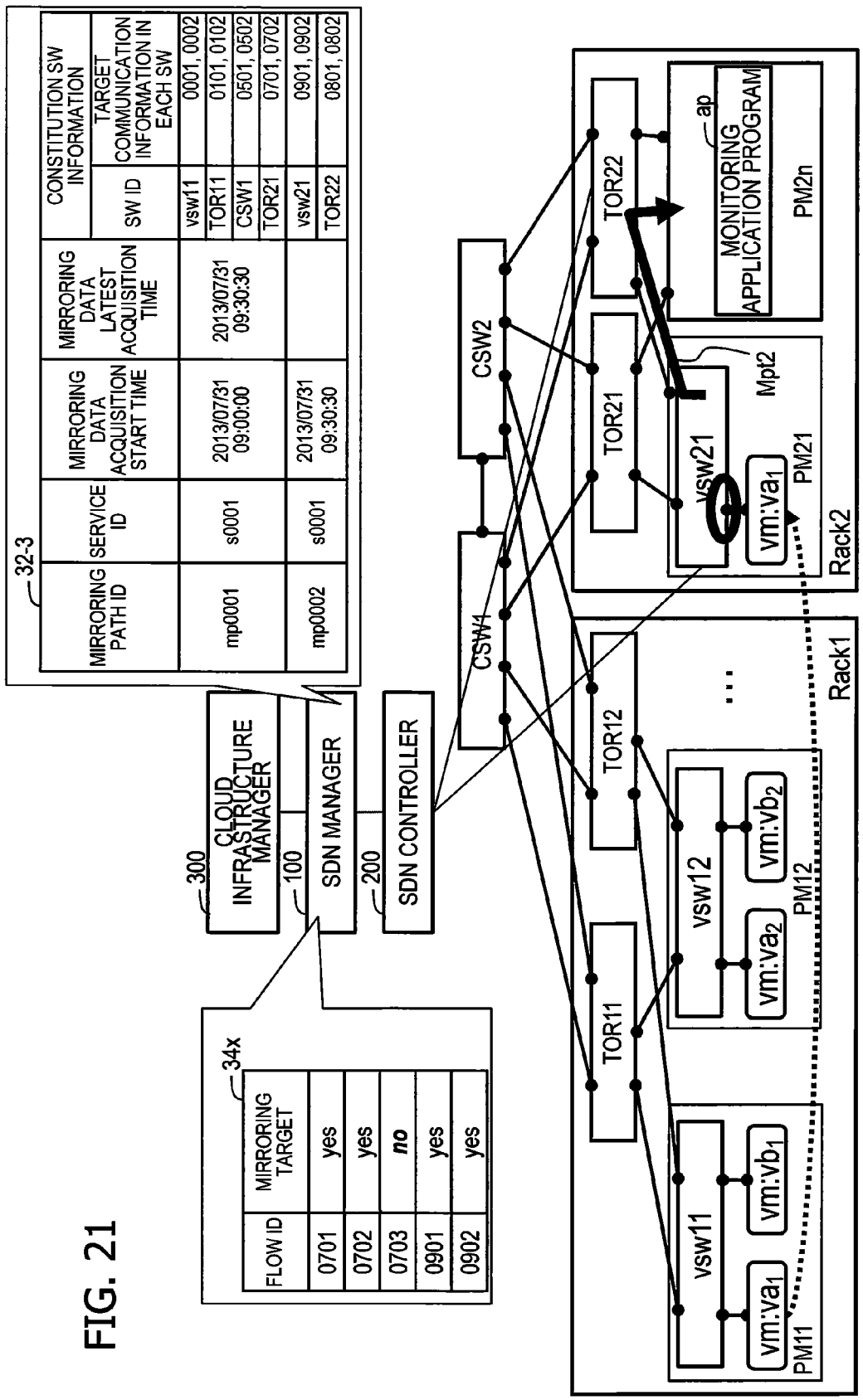
FIG. 21 is a diagram explaining processing at the time of the migration in the specific example according to the second embodiment.

FIG. 21 is a diagram explaining processing at the time of completion of the migration in the specific example according to the second embodiment. The mirroring path calculation part 22 in the SDN manager 100 confirms the physical machine PM21 where the virtual machine for the monitoring of the monitoring service is located (S11 in FIG. 7). Then, the mirroring path calculation part 22 calculates new mirroring path "mp0002 (the switch vsw21-the switch TOR22)" Mpt2 (S12).

The mirroring path calculation part 22 adds information of mirroring path "mp0002" to the mirroring communication constitution information 32-3. In FIG. 21, the mirroring communication constitution information 32-3 includes the mirroring pass ID "mp0002", the service ID "S0001", the mirroring data acquisition start time "2013/07/31 09:30:30", the constitution switch ID "vsw21, TOR22" as switch information to constitute the mirroring path, and the flow ID.

And the course change instruction part 23 in the SDN manager 100 instructs a course change to the SDN controller 200. For example, the course change instruction part 23 deletes the flow for the mirroring path "mp0001" before the occurrence of the migration and distributes the flow of new mirroring path "mp0002". Thereby, the switch vsw21 performs the mirroring of a packet of flow ID "0901, 0902" and transfers it to the switch TOR22. In addition, the switch TOR22 transmits a packet of the flow ID "0801, 0802" transmitted by the switch vsw21 to the monitoring server PM2n. In addition, the communication result collection part 24 adds information of the flow ID "0701, 0702, 0703, 0901, 0902" 34x for the mirroring path "mp0002" to the mirroring path communication record 34.

FIG. 22A and FIG. 22B are diagrams illustrating the mirroring path communication records 34-5, 34-6 in the specific example. By using FIG. 22, the process after end of the monitoring period of the monitoring service "S0001" will be explained. As depicted by FIG. 22A and FIG. 22B, the mirroring path communication records has the mirroring path communication record 34-6 of the mirroring path "mp0002" after the occurrence of the migration in addition to the mirroring path communication record 34-5 of the mirroring path "mp0001" before the occurrence of the migration.

According to the mirroring path communication record 34-5 of the mirroring path "mp0001" before the occurrence of the migration in FIG. 22A, a period "from 09:20:30 to 09:20:33" is a period when the number of packets of all flow ID, in which the mirroring target is "no", is "0". In addition, according to the mirroring path communication record 34-6 of the mirroring path "mp0002" after the occurrence of the migration in FIG. 22B, the periods "from 09:34:09 to 09:34:12, from 09:59:54 to 09:59:57" is periods when the number of packets of all flow ID, in which the mirroring target is "no", is "0". Therefore, the occupation specific part 25 detects the occupations "from 09:20:30 to 09:20:33, from 09:34:09 to 09:34:12, from 09:59:54 to 09:59:57.

FIG. 23 is a diagram indicating the occupation information 35-2 in the specific example. The occupation information 35-2 includes a first occupation "2013/07/31 from 09:20:30 to 09:20:33" before the occurrence of the migration Mg, and a second occupation "2013/07/31 from 09:34:09 to 09:34:12, 2013/07/31 from 09:59:54 to 09:59:57" after the occurrence of the migration Mg, for the monitoring service "S0001". The reply part 26 in the SDN manager 100 notifies the occupation which is detected to the user Tu of the tenant, for example.

In this way, the control process of the acquisition method of the packet according to the second embodiment again controls one or more relay devices to connect the virtual machine for the monitoring and the monitoring device when the physical device that the virtual machine for the monitoring operates changes. In addition, the detection process extracts the first occupation before changing the physical device that the virtual machine for the monitoring operates and the second occupation after the change of the physical device that the virtual machine for the monitoring operates. And the extraction process extracts the mirror packet that arrived at it in the first occupation and the second occupation among the mirror packets that accumulated.

According to the packet acquisition method in the second embodiment, even if the migration occurred, it is possible that the monitoring server continuously acquires packets for the monitoring and detects the occupation in each period before and after the occurrence of the migration. Therefore, it is possible to realize appropriate monitoring processing based on a high precision packet, even if the migration occurred, in addition to the effect in the first embodiment.

(Third Embodiment)

In the first and second embodiments, when the user Tu of the tenant instructs a virtual machine for the monitoring to the SDN manager 100, the user designates the identification information of the virtual machine. In contrast, in the third embodiment, the user Tu of the tenant appoints the virtual machine for the monitoring based on application program for the monitoring.

The user Tu of the tenant appoints a template of the system constitution such as two hierarchy system/three hierarchy systems at the time of the construction of the virtual system. And the cloud company deploys the virtual machine according to an appointed template and builds the application (web server, app (application) server, and db (database) server) for each virtual machine. Therefore, the user Tu of the tenant distinguishes the monitoring point based on application.

Figure 24:
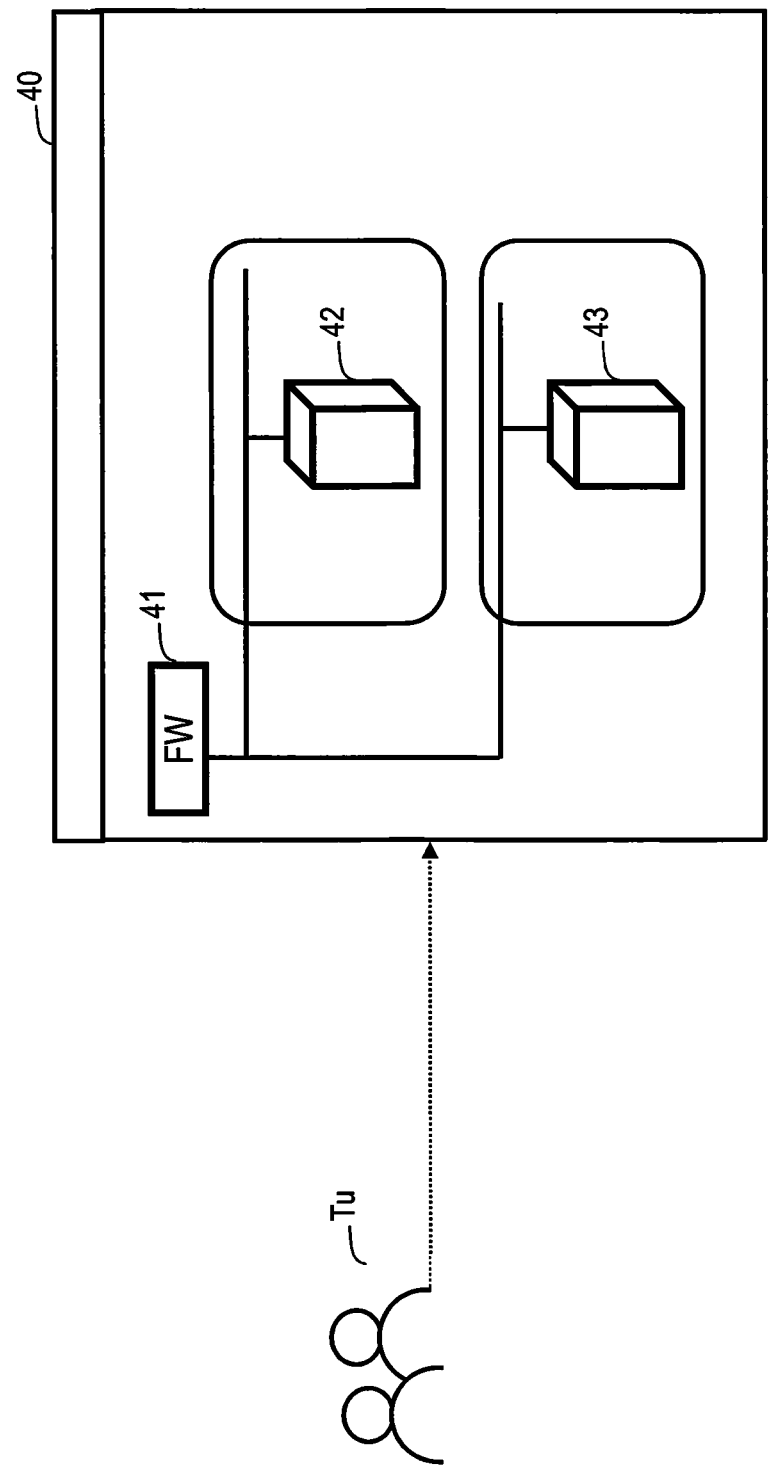
FIG. 24 is a diagram explaining a third embodiment.

FIG. 24 is a diagram explaining a third embodiment. FIG. 24 illustrates an example of portal screen 40 for the tenant Ta of which the cloud company provides. The portal screen 40 exemplifies the firewall 41, the web/app server 42, and the db server 43 as constitution of the tenant Ta. The user Tu of the tenant recognizes the servers 42, 43 corresponding to each application to constitute the system, based on the portal screen 40. And the user Tu of the tenant appoints the virtual machine for the monitoring target by designating an application (for example, the db server) equipped with the virtual machine, not designating the identification information (for example, va1) of the machine for the monitoring.

Figure 25:
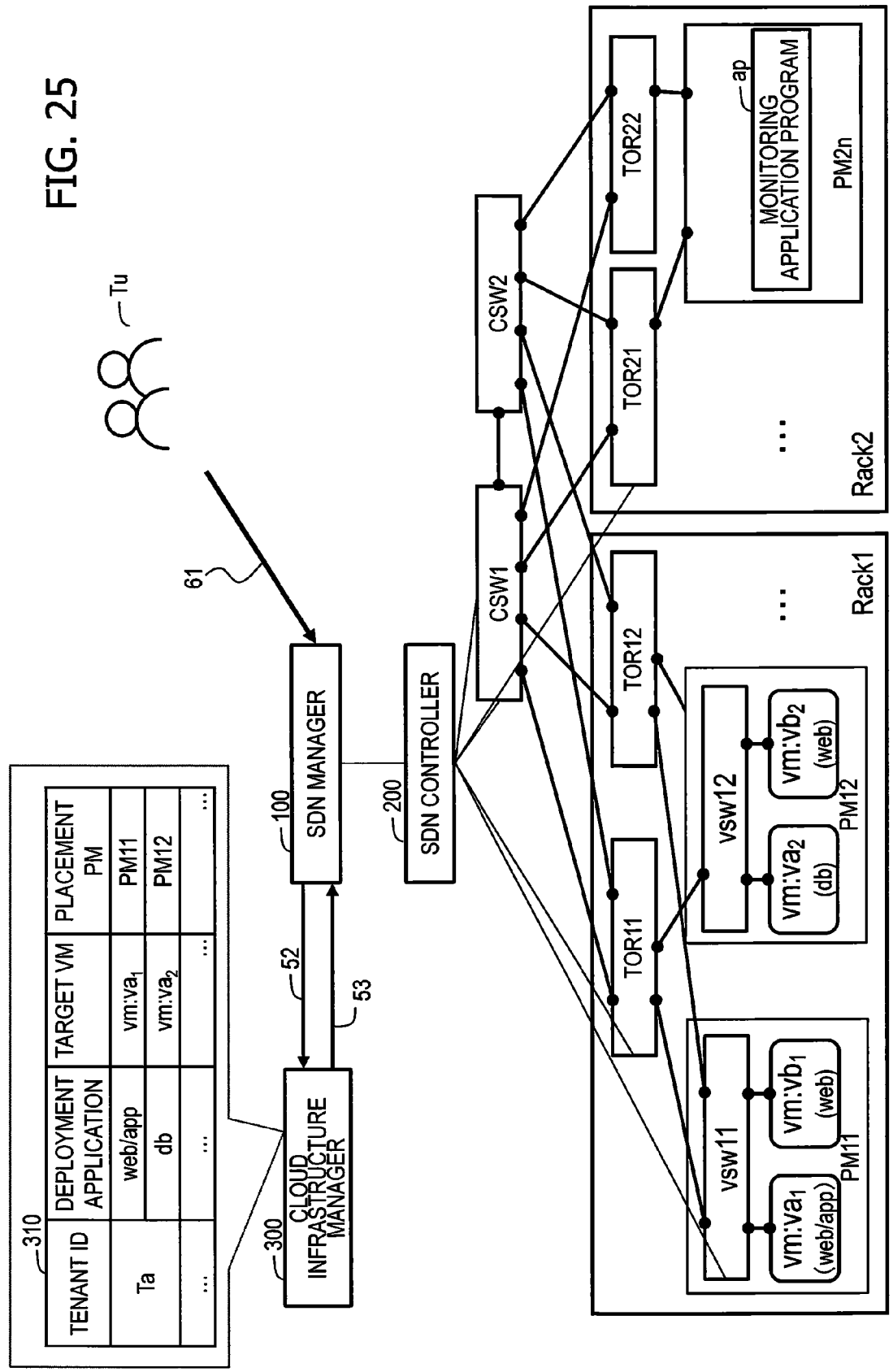
FIG. 25 is a diagram explaining the specific example according to the third embodiment.

FIG. 25 is a diagram explaining the specific example according to the third embodiment. In FIG. 25, same elements as that in FIG. 1 are marked by same references. In an example of FIG. 25, the virtual machine va1 is the web/app server of the tenant Ta, and the virtual machine vb1 is the db server of the tenant Ta. In addition, the cloud infrastructure manager 300 manages the virtual machine and applications which are built to the virtual machine, based on an application management table 310.

For example, in FIG. 25, the application management table 310 includes information of the tenant ID, the deployment application, the target VM (Virtual Machine), and the placement PM. Specially, the application management table 310 in FIG. 25 has information that the application "web/app" corresponds to the virtual machine va1 and that the virtual machine va1 operates on the physical machine PM11. In addition, the application management table 310 has information that the application "db" corresponds to the virtual machine va2 and that the virtual machine va2 operates on the physical machine PM21.

At first, the SDN manager 100 accepts start demand 51 of the monitoring service from the user Tu of the tenant. For example, the start demand 61 of the monitoring service has the monitoring point "db server" and the monitoring period "2013/07/31 from 09:00:00 to 10:00:00". Then, the SDN manager 100 inquires to the cloud infrastructure manager 300 for the virtual machine corresponding to the monitoring point "db server" of required monitoring service. For example, the SDN manager 100 transmits "tenant Ta, target application DB" to the cloud infrastructure manager 300 as the deployment VM information inquiry information 52.

And the cloud infrastructure manager 300 refers to the application management table 310 based on the deployment VM information inquiry information 52, and sends the identification information (53) of the target virtual machine and the identification information of the physical machine in which the target virtual machine operates, to the SDN manager. The cloud infrastructure manager 300 transmits the virtual machine information "va2" and the physical machine information "PM2" that the virtual machine operates, for example. The following processing of the SDN manager 100 is similar to that in the second embodiment.

In this way, according to the acquisition method of the packet of the third embodiment, it is possible to appoint the virtual machine for the monitoring based on the identification information of the virtual machine or the classification of the virtual machine. In other words, according to the third embodiment, it is possible to appoint the virtual machine which becomes a monitoring point based on application for the monitoring as well as the identification information of the virtual machine. Therefore, the user Tu of the tenant does not need to grasp the correspondence the application with the virtual machine.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for acquiring a packet of a monitoring target, the method comprising:
   forming, by a control unit, a mirror path for arriving a mirror packet of a packet, of which an origin or a destination of a transmission is a virtual machine for the monitoring target among a plurality of virtual machines, at a monitoring device which monitors the mirror packet through one or more relay devices that relay a regular packet transmitted between the plurality of virtual machines;
   detecting, by the control unit, an occupation when each relay device, which constitutes the mirror path, does not relay the regular packet based on history information of the regular packets and the mirror packets which are relayed by the each relay device;
   accumulating, by the monitoring device, the mirror packets which arrived at the monitoring device; and extracting, by the monitoring device, the mirror packet which arrived at in the occupation as the packet for the monitoring target.

2. The method for acquiring according to claim 1, wherein the forming comprises:
controlling the relay device so that the mirror packet arrives at the monitoring device through one or more relay devices.

3. The method for acquiring according to claim 1, wherein the detecting comprises:
detecting a period of which a packet amount in a course except a course, of which the origin or the destination of a transmission is the virtual machine for the monitoring target, is "0", as the occupation, based on the history information of the packet which has data amount of the packet for each of course having the origin and the destination of the packet.

4. The method for acquiring according to claim 3, wherein the detecting comprises:
detecting an unit period of which the packet amount in the course except the course, of which the origin or the destination of a transmission is the virtual machine for the monitoring target, is "0", as the occupation, based on the history information of the packet which has data amount of the packet for each of the unit period.

5. The method for acquiring according to claim 2, wherein the controlling further comprises:
detecting a plurality of relay path candidates indicating one or more relay devices which connect the monitoring device to the virtual machine for the monitoring target;
selecting the relay path candidate that there is the least total data quantity of the packet to pass or the relay path candidate having a longest period when the packet does not pass, as the relay path, among the plurality of relay path candidates; and
controlling the relay device included in the relay path.

6. The method for acquiring according to claim 2, wherein the method further comprises:
when the physical device in which the virtual machine operates is changed, re-controlling one or more relay devices which connect the monitoring device to the virtual machine, and
wherein the detecting comprises detecting a first occupation before a change of the physical device and a second occupation after the change of the physical device, and
wherein the extracting comprises extracting the mirror packet which arrived at in the first and second occupations as the packet for the monitoring target.

7. The method for acquiring according to claim 1, wherein the method further comprises:
appointing the virtual machine for the monitoring target by one of device identification information and classification of the virtual machine.

8. The method for acquiring according to claim 1, wherein the method further comprises:
designating a monitoring period of the packet, and
wherein the detecting comprises detecting the occupation during designated monitoring period.

9. A device for acquiring a packet of a monitoring target, the device comprising:
a memory configured to store history information of regular packets and mirror packets which are relayed by each relay device; and
a control unit configured to form a mirror path for arriving a mirror packet of a packet, of which an origin or a destination of a transmission is a virtual machine for the monitoring target among a plurality of virtual machines, at a monitoring device which monitors the mirror packet through one or more relay devices that relay the regular packet transmitted between the plurality of virtual machines, detect an occupation when each relay device, which constitutes the mirror path, does not relay the regular packet based on the history information of the packet, and notify the occupation to the monitoring device for accumulating the mirror packets which arrived at the monitoring device and extracting the mirror packet which arrived at in the occupation as the packet for the monitoring target.

10. The device according to claim 9, wherein the control unit is configured to control the relay device so that the mirror packet arrives at the monitoring device through one or more relay devices.

11. The device according to claim 9, wherein the control unit is configured to detect a period of which a packet amount in a course except a course, of which the origin or the destination of a transmission is the virtual machine for the monitoring target, is "0", as the occupation, based on the history information of the packet which has data amount of the packet for each of course having the origin and the destination of the packet.

12. The device according to claim 11, wherein the control unit is configured to detect an unit period of which the packet amount in the course except the course, of which the origin or the destination of a transmission is the virtual machine for the monitoring target, is "0", as the occupation, based on the history information of the packet which has data amount of the packet for each of the unit period.

13. The device according to claim 10, wherein the control unit is configured to detect a plurality of relay path candidates indicating one or more relay devices which connect the monitoring device to the virtual machine for the monitoring target, select the relay path candidate that there is the least total data quantity of the packet to pass or the relay path candidate having a longest period when the packet does not pass, as the relay path, among the plurality of relay path candidates, and control the relay device included in the relay path.

14. The device according to claim 10, wherein the control unit, when the physical device in which the virtual machine operates is changed, is configured to re-control one or more relay devices which connect the monitoring device to the virtual machine, detect a first occupation before a change of the physical device and a second occupation after the change of the physical device, and extract the mirror packet which arrived at in the first and second occupations as the packet for the monitoring target.

15. The device according to claim 9, wherein the control unit is configured to receive the virtual machine for the monitoring target by one of device identification information and classification of the virtual machine.

16. The device according to claim 9, wherein the control unit is configured to receive designated monitoring period of the packet, and detects the occupation during designated monitoring period.

17. A computer-readable non-transitory tangible recording medium having stored therein a program for causing a computer to execute a process for acquiring a packet of a monitoring target, the process comprising:
forming, by a control unit, a mirror path for arriving a mirror packet of a packet, of which a origin or a destination of a transmission is a virtual machine for the monitoring target among a plurality of virtual machines, at a monitoring device which monitors the mirror packet through one or more relay devices that relay a regular packet transmitted between the plurality of virtual machines;

detecting, by the control unit, an occupation when each relay device, which constitutes the mirror path, does not relay the regular packet based on history information of the regular packets and the mirror packets which are relayed by each relay device;

accumulating, by the monitoring device, the mirror packets which arrived at the monitoring device; and extracting, by the monitoring device, the mirror packet which arrived at in the occupation as the packet for the monitoring target.

18. The computer-readable non-transitory tangible recording medium according to claim 17, wherein the forming comprises:

controlling the relay device so that the mirror packet arrives at the monitoring device through one or more relay devices.

19. The computer-readable non-transitory tangible recording medium method according to claim 17, wherein the detecting comprises:

detecting a period of which a packet amount in a course except a course, of which the origin or the destination of a transmission is the virtual machine for the monitoring target, is "0", as the occupation, based on the history information of the packet which has data amount of the packet for each of course having the origin and the destination of the packet.

20. The computer-readable non-transitory tangible recording medium method according to claim 19, wherein the detecting comprises:

detecting an unit period of which the packet amount in the course except the course, of which the origin or the destination of a transmission is the virtual machine for the monitoring target, is "0", as the occupation, based on the history information of the packet which has data amount of the packet for each of the unit period.

* * * * *